(12) United States Patent
Chang

(10) Patent No.: US 12,738,758 B2
(45) Date of Patent: Sep. 15, 2026

(54) POWER SUPPLY DEVICE AND METHOD OF POWER MANAGEMENT

(71) Applicant: Lanto Electronic Limited, Kunshan City (CN)

(72) Inventor: Chih Hsiung Chang, Kunshan City (CN)

(73) Assignee: Lanto Electronic Limited, Kunshan City (CN)

( * ) Notice: Subject to any disclaimer, the term of this patent is extended or adjusted under 35 U.S.C. 154(b) by 0 days.

(21) Appl. No.: 19/247,167

(22) Filed: Jun. 24, 2025

(65) Prior Publication Data

US 2026/0189048 A1 Jul. 2, 2026

(30) Foreign Application Priority Data

Dec. 31, 2024 (CN) ......................... 202412000450.7

(51) Int. Cl.
*H02J 7/90* (2026.01)
*H02M 3/04* (2006.01)

(52) U.S. Cl.
CPC ............... *H02J 7/933* (2026.01); *H02M 3/04* (2013.01)

(58) Field of Classification Search
CPC ...... H02J 7/933; H02J 7/90; H02J 7/60; H02J 7/82; H02J 7/92; H02M 3/04
See application file for complete search history.

(56) References Cited

U.S. PATENT DOCUMENTS

2013/0307464 A1* 11/2013 Zhu .......................... H02J 7/35 320/101
2014/0312691 A1* 10/2014 Doljack .................... H02J 7/02 307/29
2018/0205253 A1* 7/2018 Kwak ....................... H02J 7/42
2020/0395772 A1* 12/2020 Hsu ........................ G01K 3/005
2021/0103326 A1* 4/2021 Kadam .................. G06F 1/266
2022/0337056 A1* 10/2022 Yeh ........................ H02J 1/102

FOREIGN PATENT DOCUMENTS

CN 211296239 U 8/2020

* cited by examiner

*Primary Examiner* — Regis J Betsch
*Assistant Examiner* — Alex W Lam
(74) *Attorney, Agent, or Firm* — MUNCY, GEISSLER, OLDS & LOWE, P.C.

(57) ABSTRACT

A power supply device includes a power port, a first power delivery port, second power delivery ports configured to receive input electrical energy, a first power switch configured to connect to a first powered device, a second power switch configured to connect to second powered devices, a battery and a microcontroller. The microcontroller obtains the input power of the input electrical energy and the total output power requirement of the first powered device and the second powered devices, and according to the input power and the total output power requirement, distributes the input electrical energy to charge the first powered device, the second powered devices and the battery, or selectively activates the battery to provide auxiliary electrical energy and distributes the input electrical energy and the auxiliary electrical energy to charge the first powered device and the second powered devices.

20 Claims, 19 Drawing Sheets

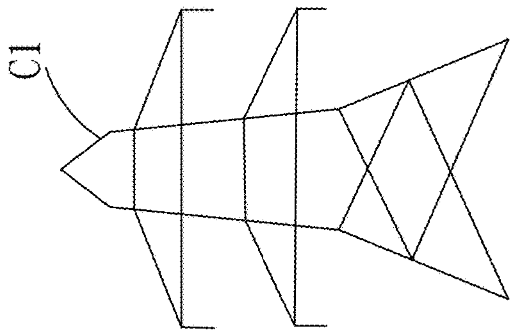
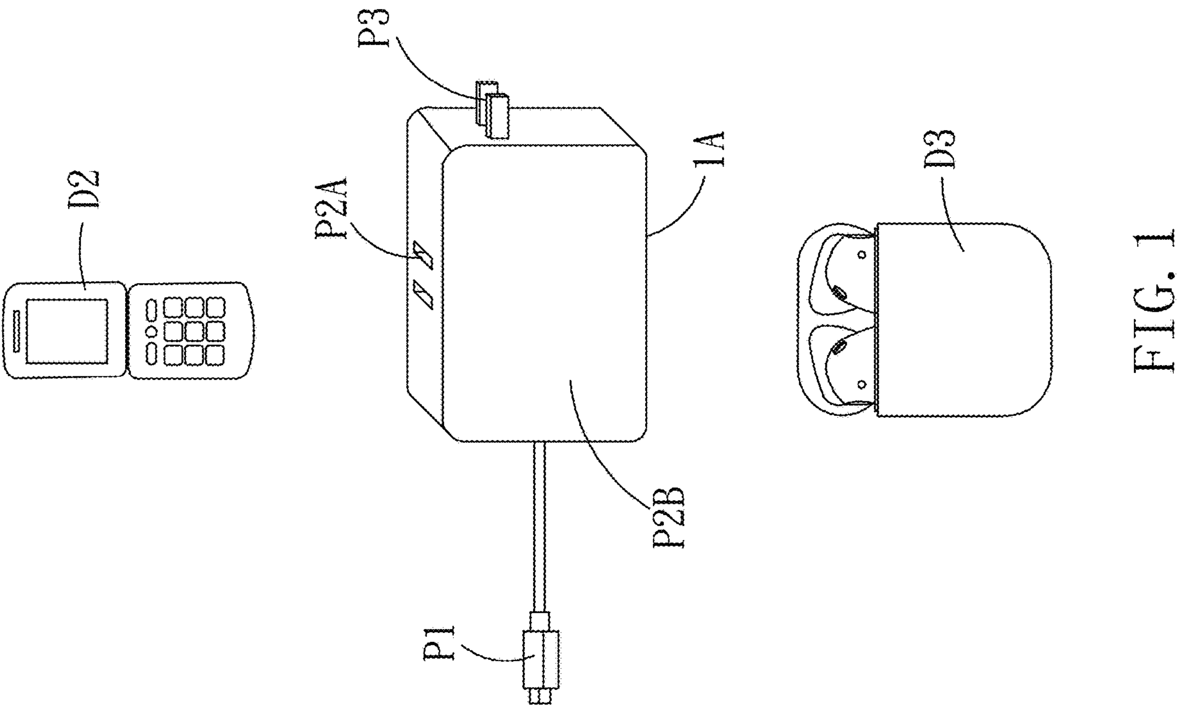
FIG. 1
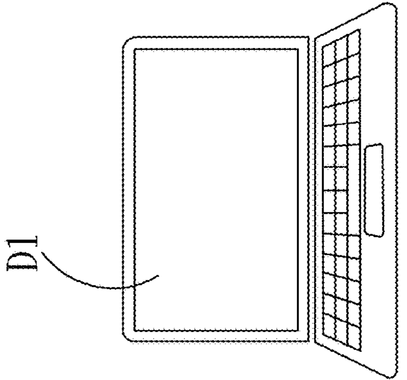

POWER SUPPLY DEVICE AND METHOD OF POWER MANAGEMENT

CROSS-REFERENCE TO RELATED APPLICATIONS

This application claims the priority benefit of Chinese Patent Application Serial Number 2024120004507, filed on Dec. 31, 2024, the full disclosure of which is incorporated herein by reference.

TECHNICAL FIELD OF THE INVENTION

The present disclosure relates to the technical field of electronic circuits, and particularly relates to a power supply device and a method of power management.

DESCRIPTION OF THE PRIOR ART

As the functions of smartphone are enhanced, the electricity consumption of the smartphone increases. Under a circumstance that the current batter of the smartphone is stationary, using a portable charger is the current solution for charging the smartphone.

There is a common limitation in the design of most of current portable chargers on the market, i.e., charging operation and discharging operation can not be synchronously performed. Specifically, the portable charger is unable to perform the discharging operation on electronic devices such as the smartphone and a laptop when being charged by utility power; therefore, a user needs to handle the charging requirement and the discharging requirement of the portable charger respectively and is unable to synchronously perform the charging operation and the discharging operation on the portable charger. The aforementioned limitation of the portable charger results in reducing the convenience thereof significantly, and especially brings a huge amount of inconvenience to the user when the user goes out or the smartphone and the portable charger require charging.

SUMMARY

In light of the aforementioned descriptions, the present disclosure provides a power supply device and a method of power management to solve the problem that the portable charger can not charge and discharge synchronously.

Based on the aforementioned descriptions, the present disclosure provides a power supply device including a power port, a first power delivery port, a plurality of second power delivery ports, a first power switch, a second power switch, a battery and a microcontroller. The power port is configured to be connected to an external power source to receive input electrical energy. The first power delivery port is configured to be connected to a first powered device. The plurality of second power delivery ports are configured to be connected to a plurality of second powered devices. The first power switch is connected to the power port and the first power delivery port. The second power switch is connected to the plurality of second power delivery ports and the first power switch. The microcontroller is connected to the power port, the first power delivery port, the plurality of second power delivery ports, the first power switch, the second power switch and the battery, obtains the input power of the input electrical energy, and calculates the total output power requirement of the first powered device and the plurality of second powered devices. The microcontroller determines whether the input power is greater than the total output power requirement; when determining that the input power is greater than the total output power requirement, the microcontroller controls the first power switch and the second power switch to switch on, and the input electrical energy is transmitted to the first power delivery port and the plurality of second power delivery ports and charges the battery; when determining that the input power is not greater than the total output power requirement, the microcontroller controls the first power switch to switch off, controls the second power switch to switch on and activates the battery to provide auxiliary electrical energy, and the input electrical energy and the auxiliary electrical energy gathers to be output electrical energy, and the output electrical energy is transmitted to the first power delivery port and the plurality of second power delivery ports.

Based on the aforementioned descriptions, the present disclosure provides a method of power management for a power supply device. The power supply device includes a power port, a first power delivery port, a plurality of second power delivery ports, a first power switch, a second power switch, a battery and a microcontroller; the power port is configured to be connected to an external power source to receive input electrical energy, the first power delivery port is configured to be connected to a first powered device, and the plurality of second power delivery ports are configured to be connected to a plurality of second powered devices. The method of power management performed by the microcontroller includes: obtaining the input power of the input electrical energy and calculating the total output power requirement of the first powered device and the plurality of second powered devices; determining whether the input power is greater than the total output power requirement; when determining that the input power is greater than the total output power requirement, controlling the first power switch and the second power switch to switch on, wherein the input electrical energy is transmitted to the first power delivery port and the plurality of second power delivery ports and charges the battery; when determining that the input power is not greater than the total output power requirement, controlling the first power switch to switch off, controlling the second power switch to switch on and activating the battery to provide auxiliary electrical energy, wherein the input electrical energy and the auxiliary electrical energy gathers to be output electrical energy, and the output electrical energy is transmitted to the first power delivery port and the plurality of second power delivery ports.

In view of the above descriptions, the power supply device and the method of power management of the present disclosure, according to the input power and the total output power requirement, distributes the input electrical energy to supply electric power to the first powered device, the second powered devices and to charge the battery, or selectively activates the battery to provide auxiliary electrical energy and distributes the input electrical energy and the auxiliary electrical energy to supply electric power to the first powered device and the second powered devices. Hence, the power supply device and the method of power management of the present disclosure are able to handle the charging requirement and the discharging requirement of the power supply device synchronously.

BRIEF DESCRIPTION OF DRAWINGS

FIG. 1 depicts the external configuration diagram of a power supply device according to one embodiment of the present disclosure.

DETAILED DESCRIPTION

Figure 2:
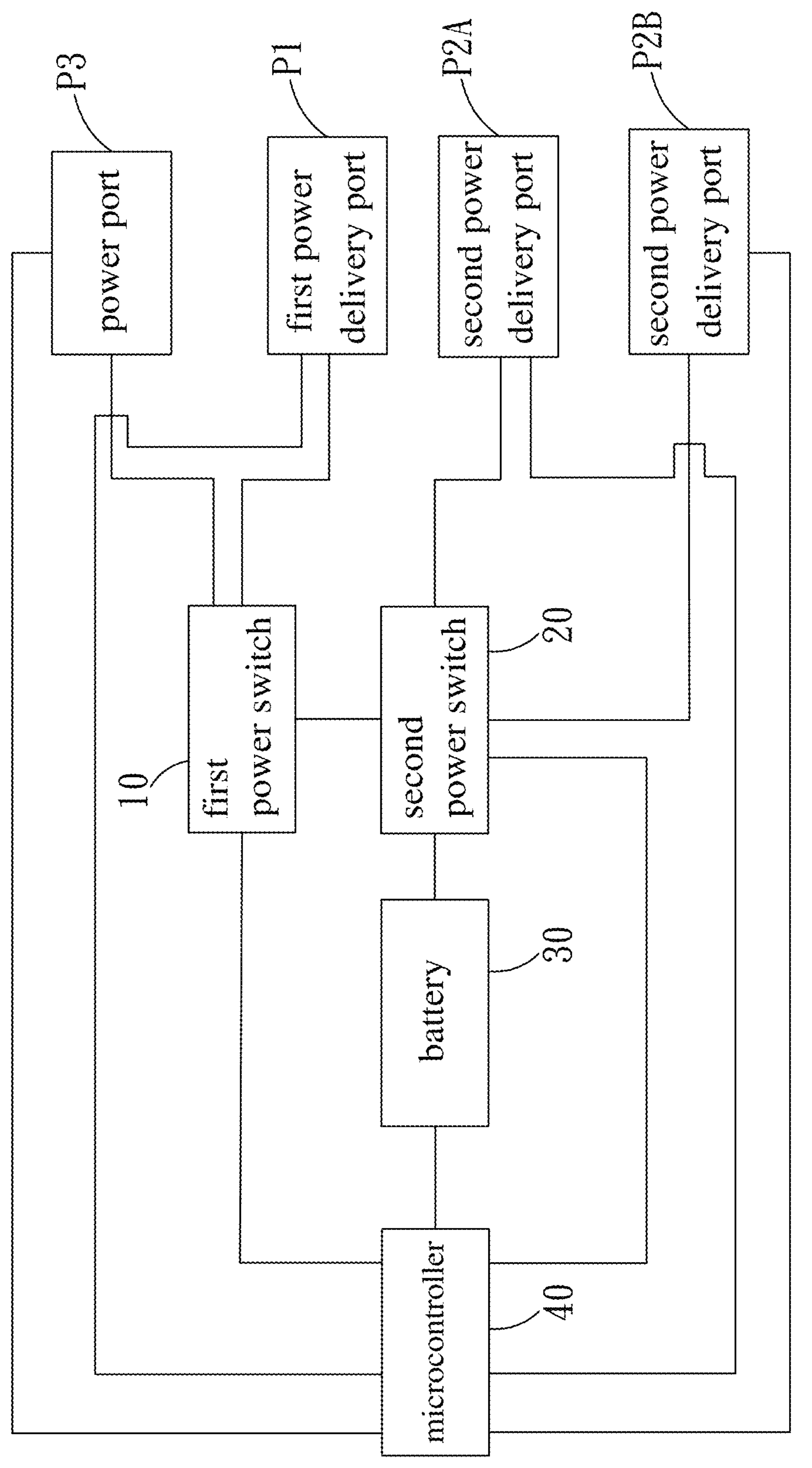
FIG. 2 depicts the internal configuration diagram of the power supply device according to one embodiment of the present disclosure.

The specific embodiments of the present disclosure given herein below is used to explain the implementation of the present disclosure. A person skilled in the art easily understands the advantages and the effects of the present disclosure from the content of the present disclosure.

It should be noted that the embodiments and the features in the embodiments of the present disclosure can be combined with each other without conflict. The present disclosure will be described in detail below with reference to accompanying drawings and in conjunction with the embodiments. In order to provide those in the art with better understanding of the solution of the disclosure, the technical solutions in the embodiments of the present disclosure will be described clearly and completely below in conjunction with the accompanying drawings in the embodiments of the present disclosure. Apparently, the described embodiments are merely one part of the embodiments of the present disclosure and not all embodiments of the present disclosure. Based on the embodiments of the present disclosure, all embodiments obtained by a person skilled in the art without any inventive steps shall fall within the scope of protection of the present disclosure.

It should be noted that the terms "first", "second", etc. in the specification and claims of the present disclosure and in the accompanying drawings are used to distinguish similar objects and not used to describe a particular order or sequence. Furthermore, the terms "comprising" and "having", and any variation thereof, are intended to encompass a non-exclusive inclusion, for example, a series of steps or units comprising processes, methods, systems, products or equipment do not need to be limited to those steps or units clearly listed but may include other steps or units not clearly listed or inherent to those processes, methods, products or equipment.

Please refer to FIG. 1, which depicts the external configuration diagram of a power supply device according to one embodiment of the present disclosure. As shown in FIG. 1, a power supply device 1A may be a portable charger. In the external configuration diagram of the power supply device 1A, the power supply device 1A includes a first power delivery port P1, second power delivery ports P2A and P2B and a power port P3. The first power delivery port P1 is configured to be connected to a first powered device D1. The second power delivery ports P2A and P2B are configured to be connected to second powered devices D2 and D3. The power port P3 is configured to be connected to an external power source C1 to receive input electrical energy.

Specifically, the first power delivery port P1 is a Universal Serial Bus (USB) Type-C port configured to be connected to the first powered device D1; in the present embodiment, the first power delivery port P1 is an external USB Type-C connector. The external USB Type-C connector is connected to or is not connected to the first powered device D1 by the USB Type-C socket of the first powered device D1, and the first powered device D1 may be a laptop, for example. When the external USB Type-C connector is inserted into the USB Type-C socket of the laptop, the first power delivery port P1 is connected to the laptop; when the external USB Type-C connector is not inserted into the USB Type-C socket of the laptop, the first power delivery port P1 is not connected to the laptop.

Specifically, the second power delivery port P2A is a USB Type-A port configured to be connected to the second powered device D2; in the present embodiment, the second power delivery port P2A is an internal USB Type-A socket. The internal USB Type-A socket is connected to or is not connected to the second powered device D2 by a USB Type-A cable, and the second powered device D2 may be a mobile phone, for example. When the USB Type-A cable connects the internal USB Type-A socket and the USB Type-A socket of the mobile phone, the second power delivery port P2A is connected to the mobile phone; when the USB Type-A cable does not connect the internal USB Type-A socket and the USB Type-A socket of the mobile phone, the second power delivery port P2A is not connected to the mobile phone.

Specifically, the second power delivery port P2B is a wireless charging pad; in the present embodiment, the second power delivery port P2B is the wireless charging pad disposed inside the power supply device 1A. The wireless charging pad is connected to or is not connected to the second powered device D3 by wireless induction, and the second powered device D3 may be a earbuds charging case, for example. When the earbuds charging case is located on the side surface of the power supply device 1A and the position of the earbuds charging case corresponds to the position of the wireless charging pad, the second power delivery port P2B is connected to the earbuds charging case; when the earbuds charging case is located on the side surface of the power supply device 1A but the position of the earbuds charging case does not correspond to the position of the wireless charging pad, the second power delivery port P2B is not connected to the earbuds charging case.

Although the foregoing second power delivery ports P2A and P2B are the different types of two power delivery ports, the second power delivery ports P2A and P2B may be the same type of two power delivery ports (e.g., USB Type-A ports). Although FIG. 1 merely exhibits the second power delivery ports P2A and P2B, the number of the second power delivery ports P2A and P2B may be adjusted according to the number of the second powered devices D2 and D3 and not be limited thereto.

The power port P3 is an input power port configured to receive an external power source C1; in the present embodiment, the power port P3 is an internal 220V AC (alternating current) plug. The internal 220V AC plug is connected to or is not connected to the external power source C1 by a power socket. For example, the external power source C1 is 220V AC electricity (i.e., utility power); when the internal 220V AC plug is connected to the power socket, the power port P3 obtains the 220V AC electricity, and the AC/DC (direct current) voltage regulator connected to the power port P3 converts the 220V AC electricity into the input electrical energy; when the internal 220V AC plug is not connected to the power socket, the power port P3 does not obtain the 220V AC electricity.

Please refer to FIG. 2, which depicts the internal configuration diagram of the power supply device according to one embodiment of the present disclosure. As shown in FIG. 2, in the internal configuration diagram of the power supply device 1A, the power supply device 1A includes a first power switch 10, a second power switch 20, a battery 30 and a microcontroller 40. The first power switch 10 is connected to the power port P3 and the first power delivery port P1, and the second power switch 20 is connected to the second power delivery ports P2A and P2B and the first power switch 10. The first power switch 10 and the second power switch 20 may be back to back metal-oxide-semiconductor field-effect transistors (BtoB MOSFETs), and the BtoB MOSFET includes two back-to-back connected MOSFETs which can prevent the reverse charging and the reverse current of the battery 30. The battery 30 is connected to the second power switch 20 and is provided with battery capacity; it should be explained that the battery capacity is a quantity of electricity which the battery 30 can offer to loads. The microcontroller 40 is connected to the power port P3, the first power delivery port P1, the second power delivery ports P2A and P2B, the first power switch 10, the second power switch 20 and the battery 30, obtains the input power of the input electrical energy and calculates the total output power requirement of the first powered device D1 and the second powered devices D2 and D3. The microcontroller 40, according to the input power and the total output power requirement, distributes the input electrical energy to supply electric power to the first powered device D1, the second powered devices D2 and D3 and to charge the battery, or selectively activates the battery 30 to provide auxiliary electrical energy and distributes the input electrical energy and the auxiliary electrical energy to supply electric power to the first powered device D1 and the second powered devices D2 and D3. The operation details of the power supply device 1A will be elaborated in the paragraphs of a method of power management.

Figure 3:
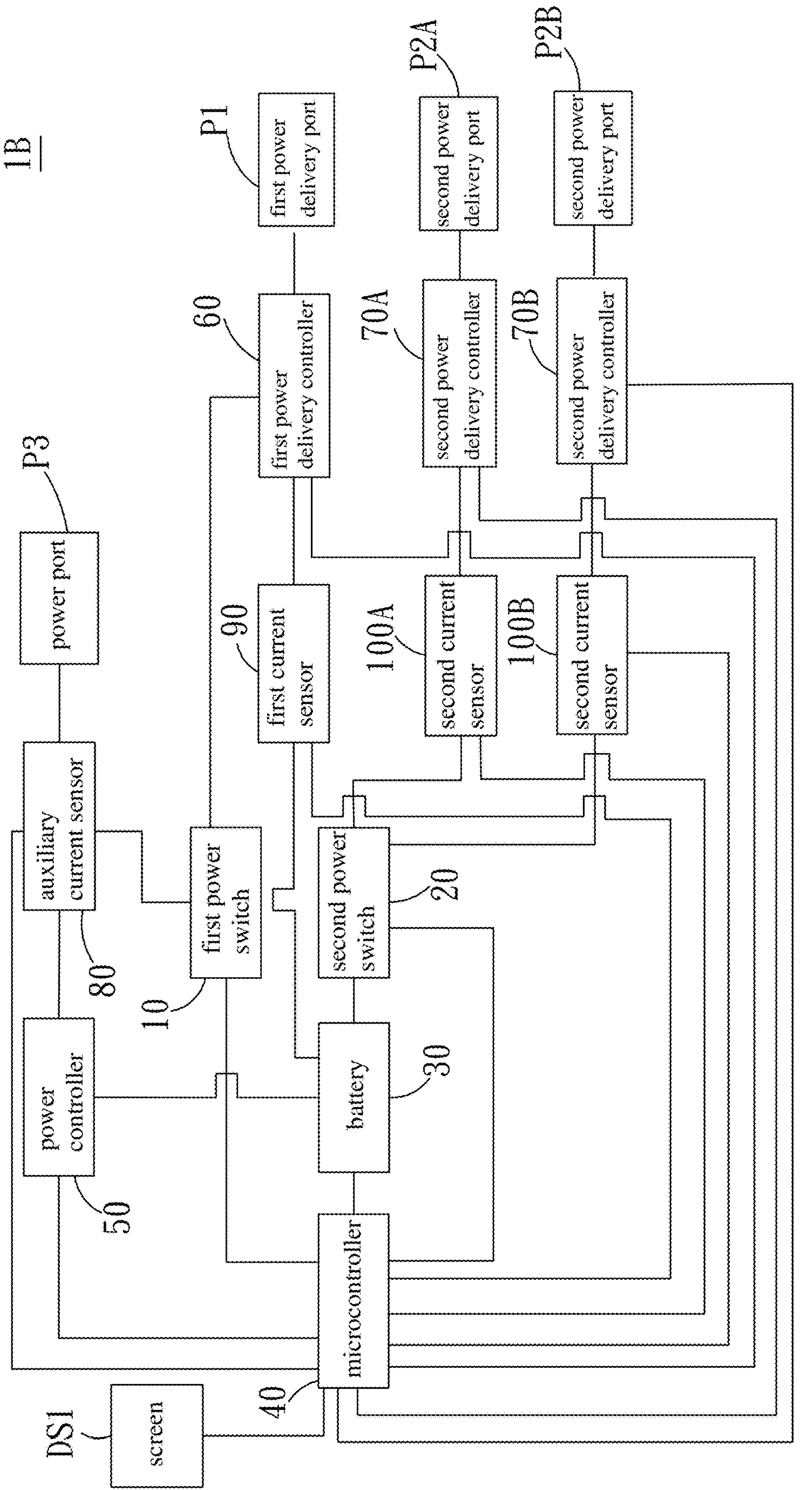
FIG. 3 depicts the external configuration diagram of a power supply device according to another embodiment of the present disclosure.

Please refer to FIG. 3, which depicts the external configuration diagram of a power supply device according to another embodiment of the present disclosure. As shown in FIG. 3, in the internal configuration diagram of the power supply device 1B, the power supply device 1B includes the first power switch 10, the second power switch 20, the battery 30, the microcontroller 40, a power controller 50, a first power delivery controller 60, second power delivery controllers 70A and 70B, an auxiliary current sensor 80, a first current sensor 90, second current sensors 100A and 100B and a screen DS1. The configurations of the first power switch 10, the second power switch 20, the battery 30 and microcontroller 40 shown in FIG. 3 are similar to the configurations of the first power switch 10, the second power switch 20, the battery 30 and microcontroller 40 shown in FIG. 2 and would not be repeated. In addition, the external configuration of the power supply device 1B is similar to the external configuration of the power supply device 1A and would not be repeated.

The power controller 50 is connected to the power port P3, the microcontroller 40 and the battery 30; in other words, the power port P3 is connected to the battery 30 by the power controller 50, and the power controller 50 is located between the power port P3 and the battery 30. The power controller 50 is provided with a charge protocol and an input voltage dynamic power management (VIN-DPM) function; the power controller 50 obtains the input power of the input electrical energy by the charge protocol and transmits the input power to the microcontroller 40 and monitors the input voltage corresponding to the input electrical energy by the VIN-DPM function to control the input current corresponding to the input electrical energy. When the input voltage corresponding to the input electrical energy is lower than a trigger threshold set by the VIN-DPM function, it indicates that the input current corresponding to the input electrical energy is overloaded, and the power controller 50 reduces the input current corresponding to the input electrical energy by the VIN-DPM function to prevent the overload and the breakdown of an adapter and to ensure the stability of the battery 30 during charging.

The first power delivery controller 60 is connected to the first power delivery port P1, the first power switch 10 and the microcontroller 40; in other words, the first power delivery port P1 is connected to the microcontroller 40 by the first power delivery controller 60, and the first power delivery controller 60 is located between the first power switch 10 and the first power delivery port P1. The first power delivery controller 60 is provided with the charge protocol and a first voltage regulator circuit. The first power delivery controller 60 obtains the first load power requirement of the first powered device D1 by the charge protocol and transmits the first load power requirement to the microcontroller 40. The first voltage regulator circuit outputs the first electrical energy corresponding to the first load power requirement according to the first load power requirement, and the first power delivery controller 60 transmits the first electrical energy corresponding to the first powered device D1 to the first power delivery port P1 by the charge protocol.

The second power delivery controller 70A is connected to the second power delivery port P2A, the second power switch 20 and microcontroller 40; in other words, the second power delivery port P2A is connected to the microcontroller 40 by the second power delivery controller 70A, and the second power delivery controller 70A is located between the second power switch 20 and the second power delivery port P2A. The second power delivery controller 70A is provided with the charge protocol and a second voltage regulator circuit. The second power delivery controller 70A obtains the second load power requirement of the second powered device D2 by the charge protocol and transmits the second load power requirement of the second powered device D2 to the microcontroller 40. The second voltage regulator circuit outputs the second electrical energy corresponding to the second load power requirement of the second powered device D2 according to the second load power requirement of the second powered device D2, and the second power delivery controller 70A transmits the second electrical energy corresponding to the second powered device D2 to the second power delivery port P2A by the charge protocol.

The second power delivery controller 70B is connected to the second power delivery port P2B, the second power switch 20 and microcontroller 40; in other words, the second power delivery port P2B is connected to the microcontroller 40 by the second power delivery controller 70B, and the second power delivery controller 70B is located between the second power switch 20 and the second power delivery port P2B. The second power delivery controller 70B is provided with the charge protocol and the second voltage regulator circuit. The second power delivery controller 70B obtains the second load power requirement of the second powered device D3 by the charge protocol and transmits the second load power requirement of the second powered device D3 to the microcontroller 40. The second voltage regulator circuit outputs the second electrical energy corresponding to the second load power requirement of the second powered device D3 according to the second load power requirement of the second powered device D3, and the second power delivery controller 70B transmits the second electrical energy corresponding to the second powered device D3 to the second power delivery port P2B by the charge protocol.

It should be noted that the charge protocol of the first power delivery controller 60 may be USB Power Delivery (PD) or USB Quick Charge (QC), and the charge protocol of the second power delivery controller 70A and the charge protocol of the power controller 50 may be the same as or be different from the charge protocol of the first power delivery controller 60; certainly, the charge protocol of the first power delivery controller 60 and the charge protocol of the second power delivery controller 70A may be the other types of the charge protocols and not be limited thereto. The charge protocol of the second power delivery controller 70B is a wireless charging standard Qi.

The first voltage regulator circuit of the first power delivery controller 60 may be a buck circuit or a buck-boost circuit, and the second voltage regulator circuit of the second power delivery controller 70A and the second voltage regulator circuit of the second power delivery controller 70B may be the same as or be different from the first voltage regulator circuit of the first power delivery controller 60. Certainly, the first voltage regulator circuit of the first power delivery controller 60, the second voltage regulator circuit of the second power delivery controller 70A and the second voltage regulator circuit of the second power delivery controller 70B may also be the other circuits with voltage regulation function and not be limited thereto.

The auxiliary current sensor 80 is connected to the power port P3, the power controller 50, the first power switch 10 and the microcontroller 40; in other words, the auxiliary current sensor 80 is located between the power port P3 and the power controller 50 and is also located between the power port P3 and the first power switch 10. The auxiliary current sensor 80 senses the input current corresponding to the input electrical energy and transmits the value of the input current to the microcontroller 40 to achieve the purpose of monitoring the input current corresponding to the input electrical energy.

The first current sensor 90 is connected to the battery 30, the first power delivery controller 60 and the microcontroller 40; in other words, the first current sensor 90 is located between the first power delivery controller 60 and the battery 30. The first current sensor 90 senses the first output current outputted to the first powered device D1 and transmits the value of the first output current to the microcontroller 40 to achieve the purpose of monitoring the first output current.

The second current sensor 100A is connected to the second power delivery controller 70A, the microcontroller 40 and the second power switch 20; in other words, the second current sensor 100A is located between the second power delivery controller 70A and the second power switch 20. The second current sensor 100A senses the second output current outputted to the second powered device D2 and transmits the value of the second output current corresponding to the second powered device D2 to the microcontroller 40 to achieve the purpose of monitoring the second output current of the second powered device D2.

The second current sensor 100B is connected to the second power delivery controller 70B, the microcontroller 40 and the second power switch 20; in other words, the second current sensor 100B is located between the second power delivery controller 70B and the second power switch 20. The second current sensor 100B senses the second output current outputted to the second powered device D3 and transmits the value of the second output current corresponding to the second powered device D3 to the microcontroller 40 to achieve the purpose of monitoring the second output current of the second powered device D3.

The screen DS1 is connected to the microcontroller 40 and displays the work mode and the alarm message of the power supply device 1B and the state of charge (SoC) of the battery 30 (e.g., 70%), and the microcontroller 40 controls the work mode of the power supply device 1B. The work mode of the power supply device 1B may be a charging mode, a standby mode, a discharging mode, a hibernate mode, a weak discharging mode or a safe output mode, and the alarm message of the power supply device 1B may be a red flashing image or an alarm text (e.g., "insufficient power supply" or "running low on the battery"). For example, the screen DS1 may be a liquid crystal display, and the foregoing descriptions are exemplary and is not used to limit the present disclosure.

Figure 4:
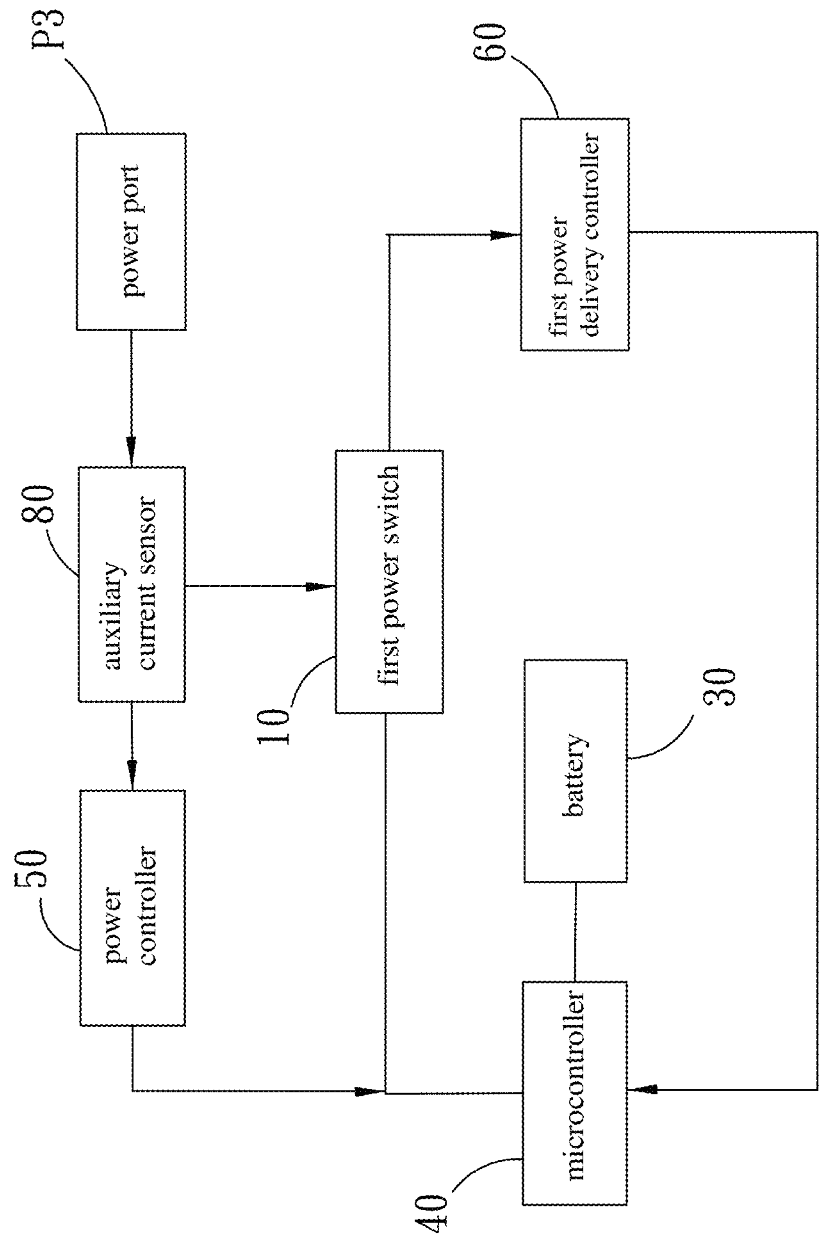
FIG. 4 depicts the schematic diagram of the power supply device in a standby mode according to another embodiment of the present disclosure.

The following will elaborate the process of the power supply device 1B from the hibernate mode to the standby mode. Please further refer to FIG. 4, which depicts the schematic diagram of the power supply device in a standby mode according to another embodiment of the present disclosure. As shown in FIG. 4, in conjunction with FIG. 3, the power supply device 1B lies in the hibernate mode and the SoC of the battery 30 is a preset value (e.g., 65%) and is not 100% when a user does not use the power supply device 1B. Before utilizing the power supply device 1B to charge the mobile phone, the user needs to perform charging operation on the power supply device 1B and connects the power port P3 to the external power source C1, and the external power source C1 inputs charging electrical energy from the power port P3. One part of the charging electrical energy passes the auxiliary current sensor 80 and the first power switch 10 and be transmitted to the first power delivery controller 60, the first power delivery controller 60 can generate and transmit a trigger signal to the microcontroller 40 due to one part of the charging electrical energy, and the microcontroller 40 switches the work mode thereof from the hibernate mode to the standby mode according to the trigger signal and activates the battery 30. The other part of the charging electrical energy passes the auxiliary current sensor 80 and the power controller 50 and is transmitted to the battery 30 to charge the battery 30. It should be noted that when the user places the power supply device 1B in a backpack or the user has not used the power supply device 1B for a long time, the first power delivery controller 60 would not generate and transmit the trigger signal to the microcontroller 40 and the microcontroller 40 remains in the hibernate mode to prevent the battery 30 from discharging excessively.

Figure 5:
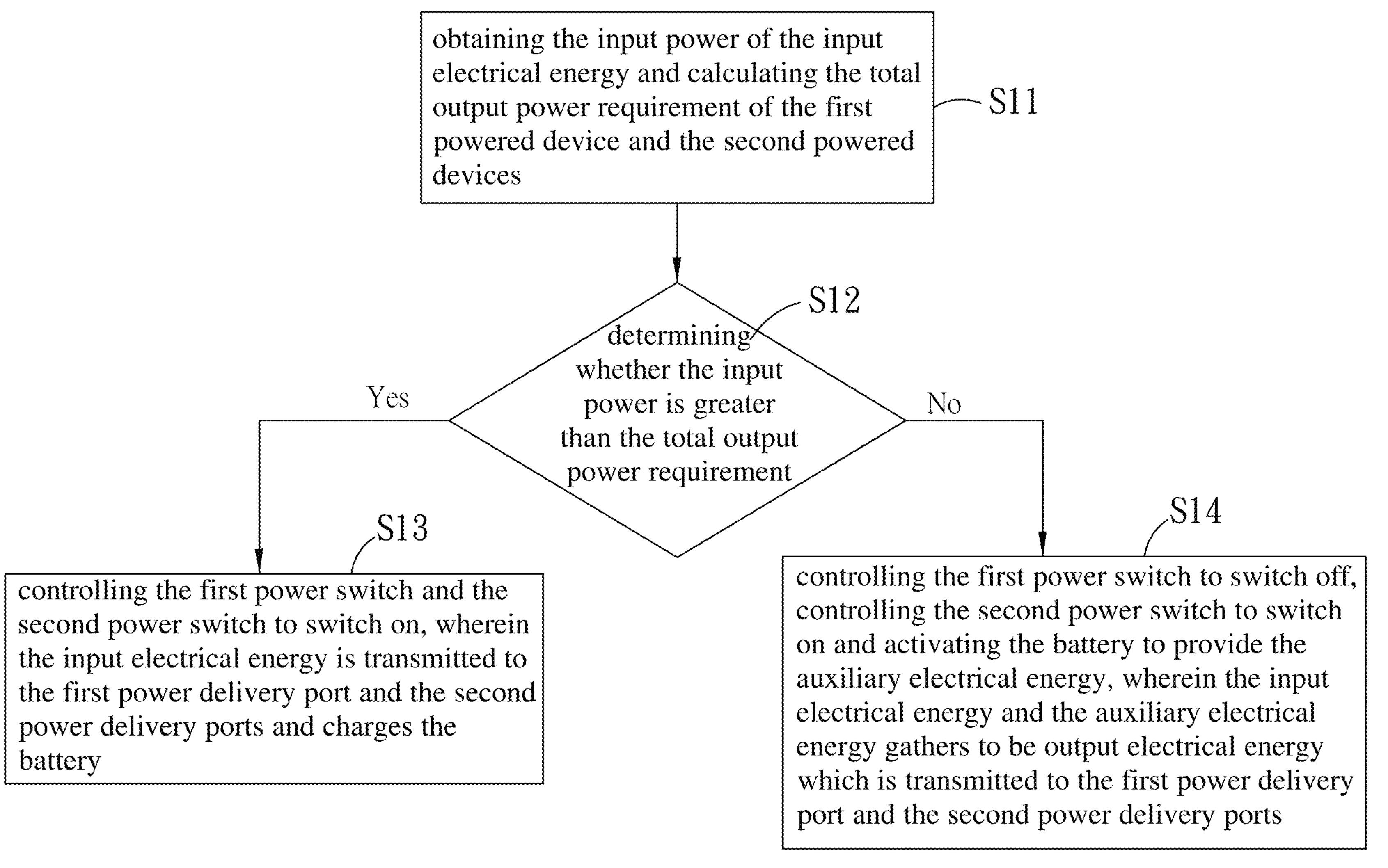
FIG. 5 depicts the flowchart of a method of power management according to one embodiment of the present disclosure.

Please refer to FIG. 5, which depicts the flowchart of a method of power management according to one embodiment of the present disclosure. As shown in FIG. 5, the method of power management includes step S11 to step S14. Step S11 to step S14 would be explained by the power supply device 1A shown in FIG. 1 and FIG. 2 as follows.

Step S11: obtaining the input power of the input electrical energy and calculating the total output power requirement of the first powered device D1 and the second powered devices D2 and D3. As described above, the microcontroller 40 obtains the input power of the input electrical energy, the first load power requirement of the first powered device D1, the second load power requirement of the second powered device D2 and the second load power requirement of the second powered device D3 from the power port P3, the first powered device D1 and the second powered device D2 and D3, and then sums up the first load power requirement of the first powered device D1, the second load power requirement of the second powered device D2 and the second load power requirement of the second powered device D3 to generate the total output power requirement. In other words, the total output power requirement is the sum of the first load power requirement of the first powered device D1, the second load power requirement of the second powered device D2 and the second load power requirement of the second powered device D3.

Step S12: determining whether the input power is greater than the total output power requirement. Specifically, the microcontroller 40 compares the input power with the total output power requirement to determine whether the input electrical energy meets the total electricity provision requirement of the first powered device D1 and the second powered devices D2 and D3 and the charging requirement of the battery 30 together. When determining the input power is greater than the total output power requirement, it indicates that the input electrical energy may meet the total electricity provision requirement of the first powered device D1 and the second powered devices D2 and D3 and the charging requirement of the battery 30 together, and the microcontroller 40 subsequently performs step S13. When determining the input power is not greater than the total output power requirement, it indicates that input electrical energy may not meet the total electricity provision requirement of the first powered device D1 and the second powered devices D2 and D3 and the charging requirement of the battery 30 together, and the microcontroller 40 subsequently performs step S14.

Figure 6:
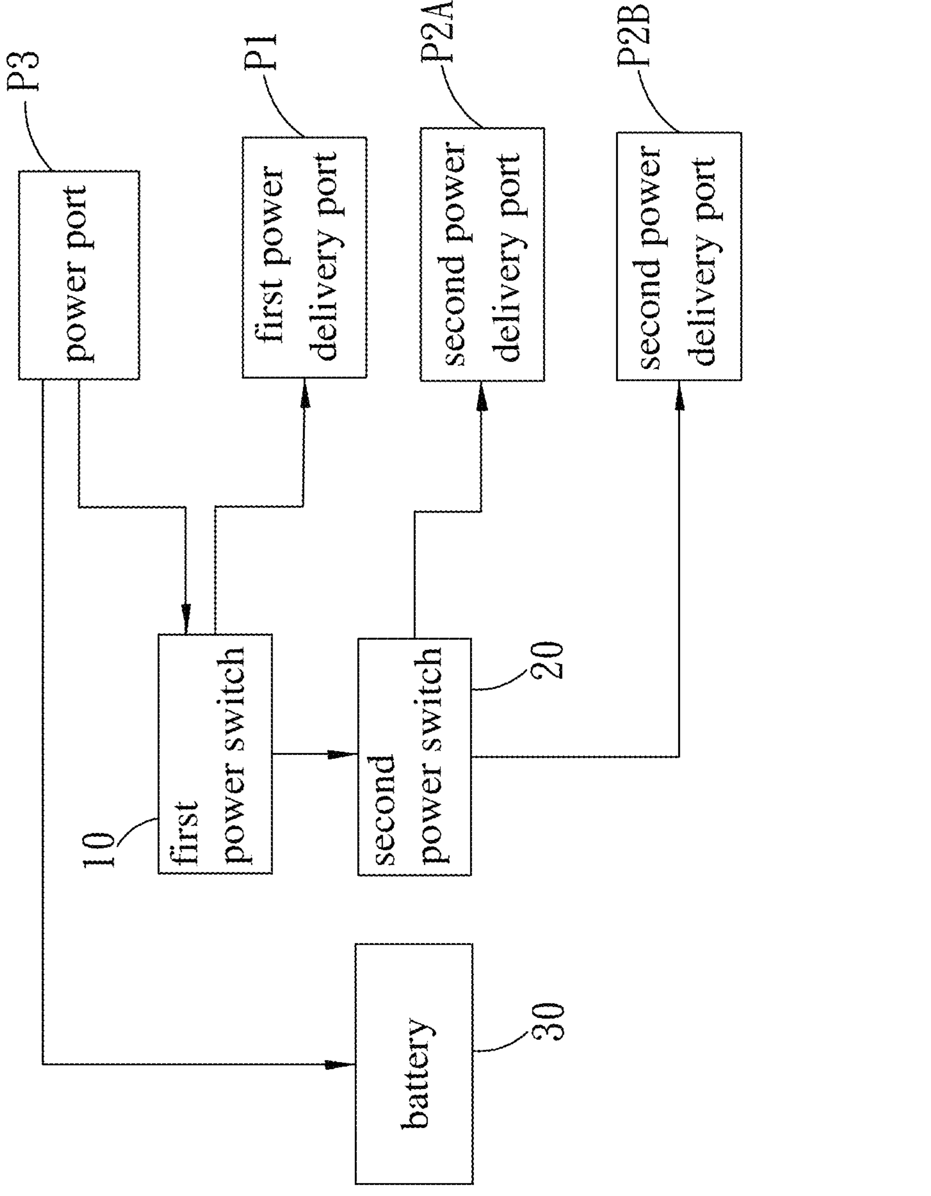
FIG. 6 depicts the operation schematic diagram of the power supply device when the input power is greater than the total output power requirement according to one embodiment of the present disclosure.

Step S13: controlling the first power switch 10 and the second power switch 20 to switch on, wherein the input electrical energy is transmitted to the first power delivery port P1 and the second power delivery ports P2A and P2B and charges the battery 30. Specifically, as shown in FIG. 6, the microcontroller 40 transmits a first control signal and a second control signal to the first power switch 10 and the second power switch 20 when determining the input power is greater than the total output power requirement, and the first power switch 10 is switched on according to the first control signal, and the second power switch 20 is switched on according to the second control signal. At present, the input electrical energy meets the total electricity provision requirement of the first powered device D1 and the second powered devices D2 and D3 and the charging requirement of the battery 30 together and includes a first electrical energy and a second electrical energy; the first electrical energy corresponds to the total electricity provision requirement of the first powered device D1 and the second powered devices D2 and D3, and the second electrical energy corresponds to the charging requirement of the battery 30. Afterwards, one part of the first electrical energy passes the first power switch 10 and is transmitted to the first power delivery port P1 to supply electric power to the first powered device D1, while the other part of the first electrical energy passes the first power switch 10 and the second power switch 20 and is transmitted to the second power delivery ports P2A and P2B; the second electrical energy is transmitted to the battery 30 to charge the battery 30, and the battery 30 is situated on a charging state.

Figure 7:
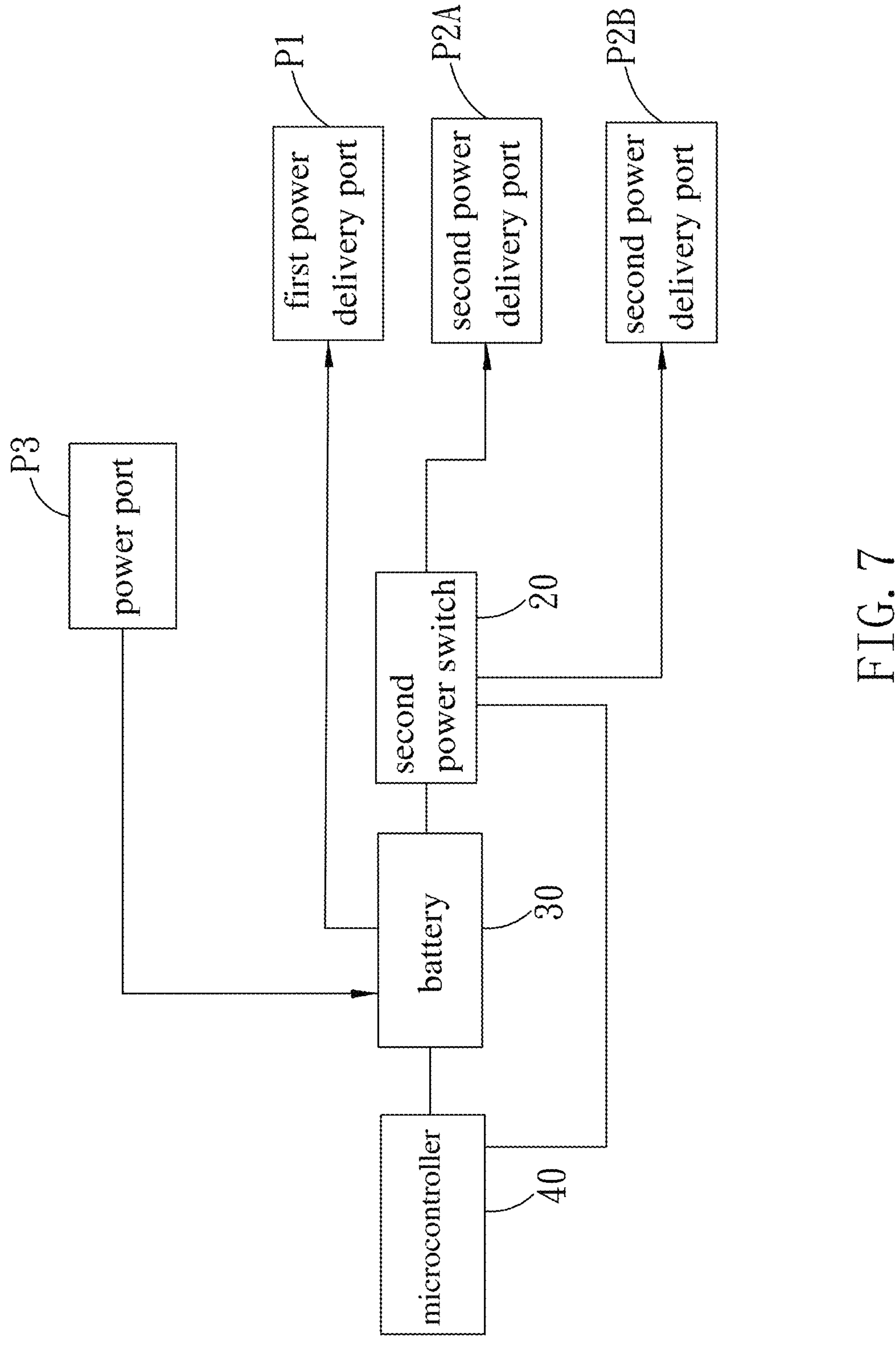
FIG. 7 depicts the operation schematic diagram of the power supply device when the input power is not greater than the total output power requirement according to one embodiment of the present disclosure.

Step S14: controlling the first power switch 10 to switch off, controlling the second power switch 20 to switch on and activating the battery 30 to provide the auxiliary electrical energy, wherein the input electrical energy and the auxiliary electrical energy gathers to be output electrical energy which is transmitted to the first power delivery port P1 and the second power delivery ports P2A and P2B. Specifically, as shown in FIG. 7, the microcontroller 40 transmits the first control signal and the second control signal to the first power switch 10 and the second power switch 20 when determining the input power is not greater than the total output power requirement, and the first power switch 10 is switched off according to the first control signal, and the second power switch 20 is switched on according to the second control signal. At present, the input electrical energy does not meet the total electricity provision requirement of the first powered device D1 and the second powered devices D2 and D3, the microcontroller 40 activates the battery 30 to provide the auxiliary electrical energy, and the battery 30 is situated on a discharging state. Because the first power switch 10 is switched off, the input electrical energy is transmitted to the battery 30 and gathers with the auxiliary electrical energy to be the output electrical energy; one part of the output electrical energy does not pass the second power switch 20 and is directly transmitted to the first power delivery port P1 to supply electric power to the first powered device D1, while the other part of the output electrical energy passes the second power switch 20 and is transmitted to the second power delivery ports P2A and P2B to supply electric power to the second power delivery ports P2A and P2B.

In the method of power management of the present embodiment, according to the input power and the total output power requirement, the input electrical energy is transmitted to the first power delivery port, the second power delivery ports and the battery to meet the total electricity provision requirement of the first powered device and the second powered devices and the charging requirement of the battery, or the battery is selectively activated to provide the auxiliary electrical energy to compensate the deficiency of the input electrical energy so that the input electrical energy and the auxiliary electrical energy meet the total electricity provision requirement of the first powered device and the second powered devices. Hence, the method of power management of the present embodiment, according to the input power and the total output power requirement, directly utilizes the input electrical energy to supply electric power to the powered devices and to charge the battery or dynamically activates the battery to provide the auxiliary electrical energy so that the input electrical energy and the auxiliary electrical energy are added to collaboratively supply electric power to the powered devices, thereby improving the power transmission efficiency of the power supply device.

Figure 8A:
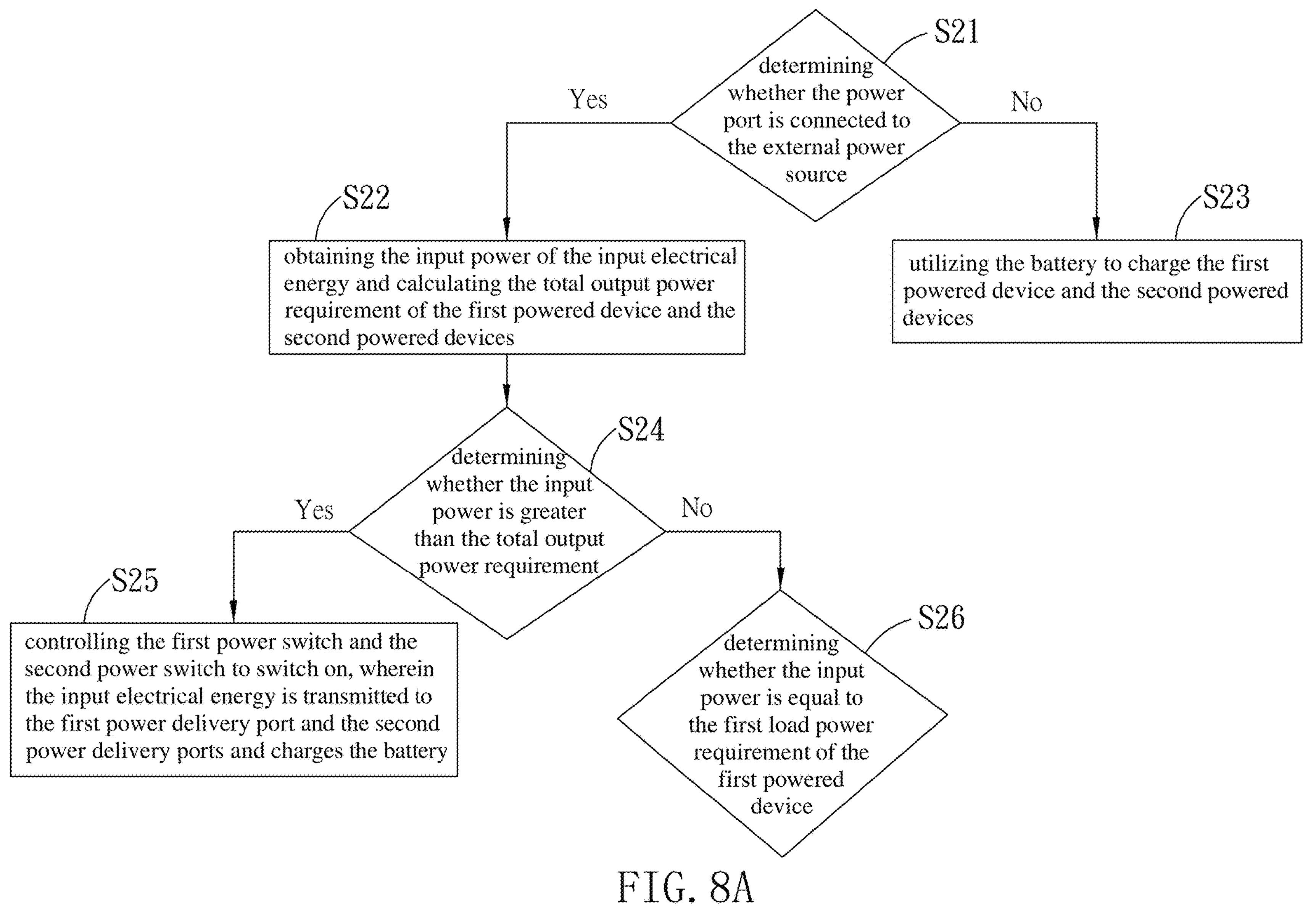
FIG. 8A and FIG. 8B depict the flowchart of a method of power management according to another embodiment of the present disclosure.
Figure 8B:
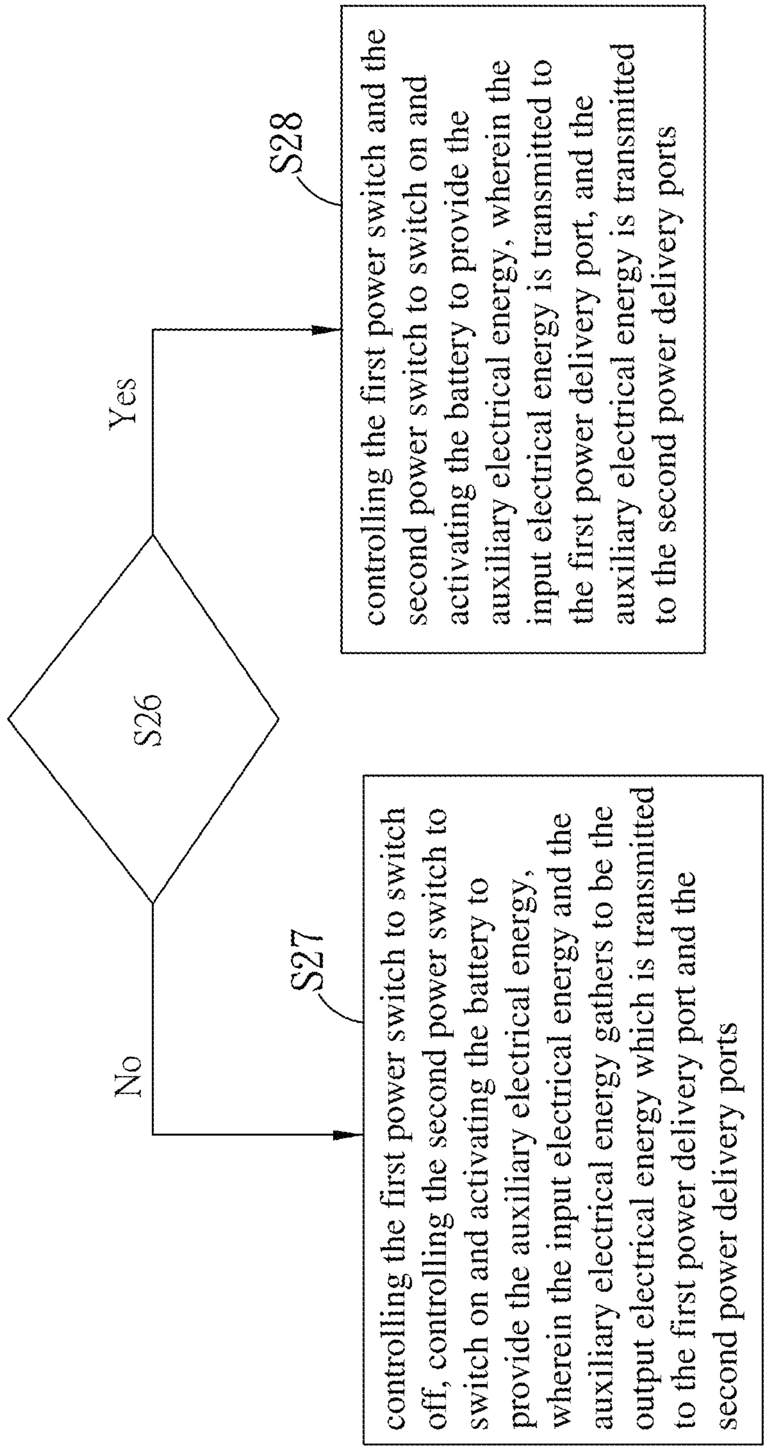

Please refer to FIG. 8A and FIG. 8B, which depict the flowchart of a method of power management according to one embodiment of the present disclosure. As shown in FIG. 8A and FIG. 8B, the method of power management includes step S21 to step S28. Step S21 to step S28 would be explained by the power supply device 1B shown in FIG. 3 as follows.

Step S21: determining whether the power port P3 is connected to the external power source C1. Specifically, the microcontroller 40 determines whether to activate the battery 30 to directly supply electric power to the first powered device D1 and the second powered devices D2 and D3 according to the connection between the power port P3 and the external power source C1. When determining that the connection between the power port P3 and the external power source C1 is that the power port P3 is connected to the external power source C1, the microcontroller 40 does not activate the battery 30 temporarily and subsequently performs step S22. When determining that the connection between the power port P3 and the external power source C1 is that the power port P3 is not connected to the external power source C1, the microcontroller 40 activates the battery 30 and subsequently performs step S23.

Step S22: obtaining the input power of the input electrical energy and calculating the total output power requirement of the first powered device D1 and the second powered devices D2 and D3. As described above, the microcontroller 40 obtains the input power of the input electrical energy from the power controller 50 and obtains the first load power requirement of the first powered device D1, the second load power requirement of the second powered device D2 and the second load power requirement of the second powered device D3 from the first power delivery controller 60 and the second power delivery controllers 70A and 70B. Afterwards, the microcontroller 40 sums up the first load power requirement of the first powered device D1, the second load power requirement of the second powered device D2 and the second load power requirement of the second powered device D3 to generate the total output power requirement.

Figure 9:
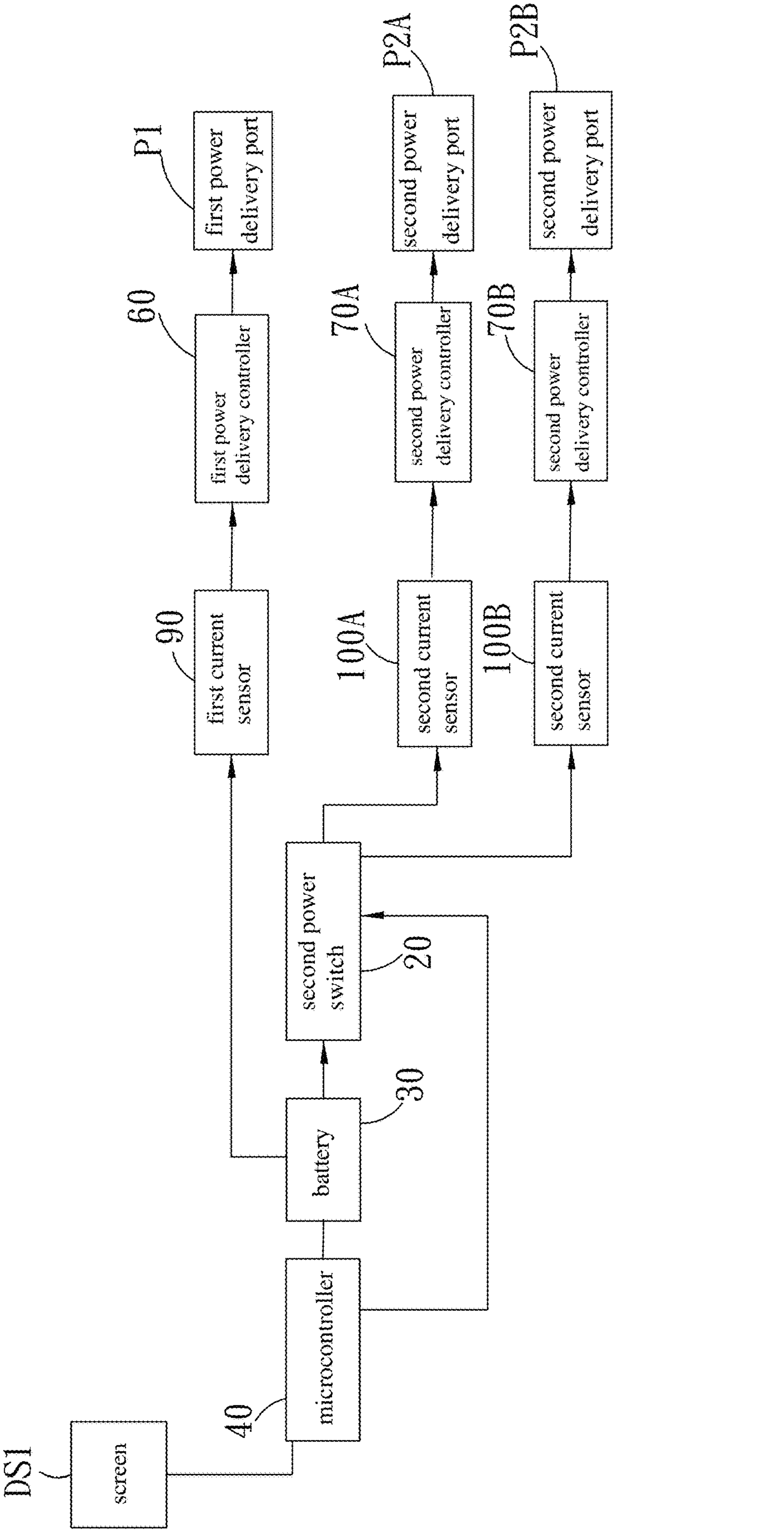
FIG. 9 depict the operation schematic diagram of the power supply device when being not connected to an external power source according to another embodiment of the present disclosure.

Step S23: utilizing the battery 30 to charge the first powered device D1 and the second powered devices D2 and D3. Specifically, as shown in FIG. 9, the screen DS1 displays that the power supply device 1B enters the discharging mode, the microcontroller 40 controls the battery 30 to transmit supply electrical energy, and the battery 30 is situated on the discharging state. The supply electrical energy includes first supply electrical energy and second supply electrical energy; the first supply electrical energy corresponds to the first load power requirement of the first powered device D1, while the second supply electrical energy corresponds to the second load power requirement of the second powered device D2 and the second load power requirement of the second powered device D3. At present, the microcontroller 40 transmits the first control signal and the second control signal to the first power switch 10 and the second power switch 20, the first power switch 10 is switched off according to the first control signal, and the second power switch 20 is switched on according to the second control signal. Afterwards, the first supply electrical energy passes the first current sensor 90 and is transmitted to the first power delivery controller 60, and the first current sensor 90 senses the output current corresponding to the first supply electrical energy and transmits the value of the output current corresponding to the first supply electrical energy to the microcontroller 40; the first power delivery controller 60 adjusts the first supply electrical energy according to the first load power requirement of the first powered device D1 and transmits the adjusted first supply electrical energy to the first power delivery port P1 to supply electric power to the first powered device D1.

The second supply electrical energy passes the second power switch 20 and is divided into a first part and a second part herein. The first part of the second supply electrical energy passes the second current sensor 100A and is transmitted to the second power delivery controller 70A, and the second current sensor 100A senses the output current corresponding to the first part of the second supply electrical energy and transmits the value of the output current corresponding to the first part of the second supply electrical energy to the microcontroller 40; the second power delivery controller 70A adjusts the first part of the second supply electrical energy according to the second load power requirement of the second powered device D2 and transmits the adjusted first part of the second supply electrical energy to the second power delivery port P2A to supply electric power to the second powered device D2. The second part of the second supply electrical energy passes the second current sensor 100B and is transmitted to the second power delivery controller 70B, and the second current sensor 100B senses the output current corresponding to the second part of the second supply electrical energy and transmits the value of the output current corresponding to the second part of the second supply electrical energy to the microcontroller 40; the second power delivery controller 70B adjusts the second part of the second supply electrical energy according to the second load power requirement of the second powered device D3 and transmits the adjusted second part of the second supply electrical energy to the second power delivery port P2B to supply electric power to the second powered device D3.

The content of step S24 is the same as the content of step S12 and would not be repeated. When determining that the input power input power is greater than the total output power requirement, the microcontroller 40 subsequently performs step S25. When determining that the input power input power is not greater than the total output power requirement, the microcontroller 40 subsequently performs step S26.

Figure 10:
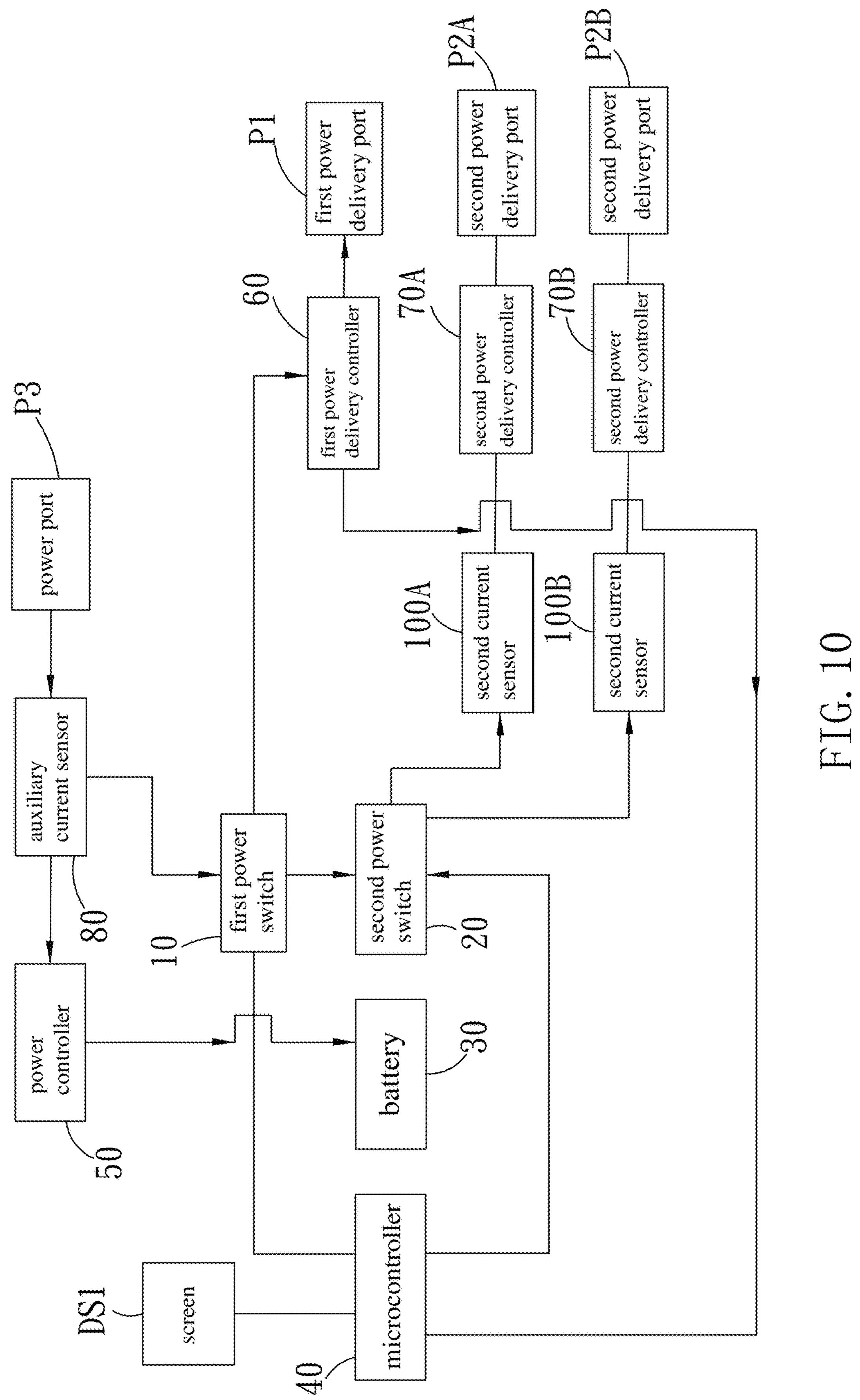
FIG. 10 depicts the operation schematic diagram of the power supply device when the input power is greater than the total output power requirement according to another embodiment of the present disclosure.

Step S25: controlling the first power switch 10 and the second power switch 20 to switch on, wherein the input electrical energy is transmitted to the first power delivery port P1 and the second power delivery ports P2A and P2B and charges the battery 30. Specifically, as shown in FIG. 10, when the microcontroller 40 determines that the input power is greater than the total output power requirement, the screen DS1 displays that the microcontroller 40 enters the charging mode, the microcontroller 40 transmits the first control signal and the second control signal to the first power switch 10 and the second power switch 20, the first power switch 10 is switched on according to the first control signal, and the second power switch 20 is switched on according to the second control signal. At present, the input electrical energy meets the total electricity provision requirement of the first powered device D1 and the second powered devices D2 and D3 and the charging requirement of the battery 30 together and includes a first electrical energy and a second electrical energy; the first electrical energy corresponds to the total electricity provision requirement of the first powered device D1 and the second powered devices D2 and D3, while the second electrical energy corresponds to the charging requirement of the battery 30.

The first electrical energy passes the first power switch 10 and is divided into first branch electrical energy and second branch electrical energy herein; the first branch electrical energy corresponds to the first load power requirement of the first powered device D1, while the second branch electrical energy corresponds to the second load power requirement of the second powered device D2 and the second load power requirement of the second powered device D3. The first branch electrical energy is transmitted to the first power delivery controller 60, and the first power delivery controller 60 adjusts the first branch electrical energy according to the first load power requirement of the first powered device D1 and transmits the adjusted first branch electrical energy to the first power delivery port P1 to supply electric power to the first powered device D1.

The second branch electrical energy passes the second power switch 20 and is divided into a first provision part and a second provision part herein. The first provision part of the second branch electrical energy passes the second current sensor 100A and is transmitted to the second power delivery controller 70A, and the second current sensor 100A senses the second output current outputted to the second powered device D2; the second power delivery controller 70A adjusts the first provision part of the second branch electrical energy according to the second load power requirement of the second powered device D2 and transmits the adjusted first provision part of the second branch electrical energy to the second power delivery port P2A to supply electric power to the second powered device D2. The second provision part of the second branch electrical energy passes the second current sensor 100B and is transmitted to the second power delivery controller 70B, and the second current sensor 100B senses the second output current outputted to the second powered device D3; the second power delivery controller 70B adjusts the second provision part of the second branch electrical energy according to the second load power requirement of the second powered device D3 and transmits the adjusted second provision part of the second branch electrical energy to the second power delivery port P2B to supply electric power to the second powered device D3.

The second electrical energy passes the auxiliary current sensor 80 and is transmitted to the power controller 50. The auxiliary current sensor 80 senses the input current corresponding to the input electrical energy and transmits the value of the input current to the microcontroller 40; the power controller 50 adjusts the second electrical energy and transmits the adjusted second electrical energy to the battery 30 to charge the battery 30, and the battery 30 is situated on the charging state.

Step S26: determining whether the input power is equal to the first load power requirement of the first powered device D1. Specifically, the microcontroller 40 determines whether to control the first power switch 10 to switch on according to the input power and the first load power requirement of the first powered device D1. When determining that the input power is equal to the first load power requirement of the first powered device D1, the microcontroller 40 controls the first power switch 10 to switch on and subsequently performs step S28. When determining that the input power is not equal to the first load power requirement of the first powered device D1, the microcontroller 40 controls the first power switch 10 to switch off and subsequently performs step S27.

Figure 11:
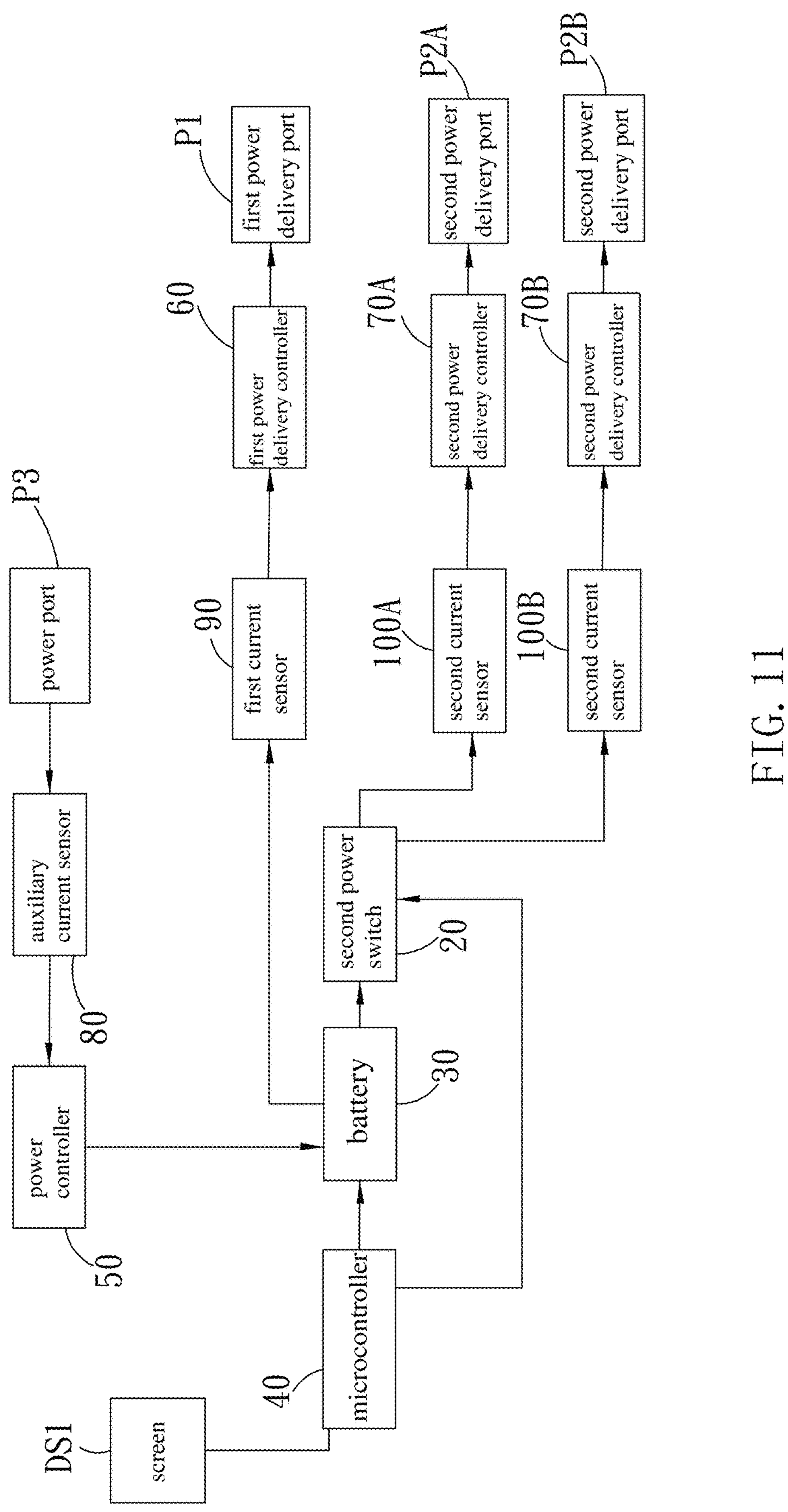
FIG. 11 depicts the operation schematic diagram of the power supply device when the input power is not greater than the total output power requirement and is not equal to the first load power requirement of the first powered device according to another embodiment of the present disclosure.

Step S27: controlling the first power switch 10 to switch off, controlling the second power switch 20 to switch on and activating the battery 30 to provide the auxiliary electrical energy, wherein the input electrical energy and the auxiliary electrical energy gathers to be the output electrical energy which is transmitted to the first power delivery port P1 and the second power delivery ports P2A and P2B. Specifically, as shown in FIG. 11, when determining that the input power is not equal to the first load power requirement of the first powered device D1, the microcontroller 40 transmits the first control signal and the second control signal to the first power switch 10 and the second power switch 20, the first power switch 10 is switched off according to the first control signal, and the second power switch 20 is switched on according to the second control signal. At present, the input electrical energy does not meet the total electricity provision requirement of the first powered device D1 and the second powered devices D2 and D3, the microcontroller 40 activates the battery 30 to provide the auxiliary electrical energy, and the battery 30 is situated on the discharging state. Because the first power switch 10 is switched off, the input electrical energy passes the auxiliary current sensor 80 and is transmitted to the power controller 50. The auxiliary current sensor 80 senses the input current corresponding to the input electrical energy and transmits the value of the input current to the microcontroller 40; the power controller 50 adjusts the input electrical energy and transmits the adjusted input electrical energy to the battery 30, and the adjusted input electrical energy and the auxiliary electrical energy gathers at the battery 30 to be the output electrical energy.

The output electrical energy includes first output electrical energy and second output electrical energy; the first output electrical energy corresponds to the first load power requirement of the first powered device D1, while the second output electrical energy corresponds to the second load power requirement of the second powered device D2 and the second load power requirement of the second powered device D3. The first output electrical energy passes the first current sensor 90 and is transmitted to the first power delivery controller 60, the first current sensor 90 senses the first output current outputted to the first powered device D1 and transmits the value of the first output current to the microcontroller 40, and the first power delivery controller 60 adjusts the first output electrical energy according to the first load power requirement of the first powered device D1 and transmits the adjusted first output electrical energy to the first power delivery port P1 to supply electric power to the first powered device D1. The second output electrical energy passes the second power switch 20 and is divided into a first output part and a second output part herein. The first output part of the second output electrical energy passes the second current sensor 100A and is transmitted to the second power delivery controller 70A, the second current sensor 100A senses the second output current outputted to the second powered device D2 and transmits the value of the second output current outputted to the second powered device D2 to the microcontroller 40, and the second power delivery controller 70A adjusts the first output part of the second output electrical energy according to the second load power requirement of the second powered device D2 and transmits the adjusted first output part of the second output electrical energy to the second power delivery port P2A to supply electric power to the second powered device D2. The second output part of the second output electrical energy passes the second current sensor 100B and is transmitted to the second power delivery controller 70B, the second current sensor 100B senses the second output current outputted to the second powered device D3 and transmits the value of the second output current outputted to the second powered device D3 to the microcontroller 40, and the second power delivery controller 70A adjusts the second output part of the second output electrical energy according to the second load power requirement of the second powered device D3 and transmits the adjusted second output part of the second output electrical energy to the second power delivery port P2B to supply electric power to the second powered device D3.

Figure 12:
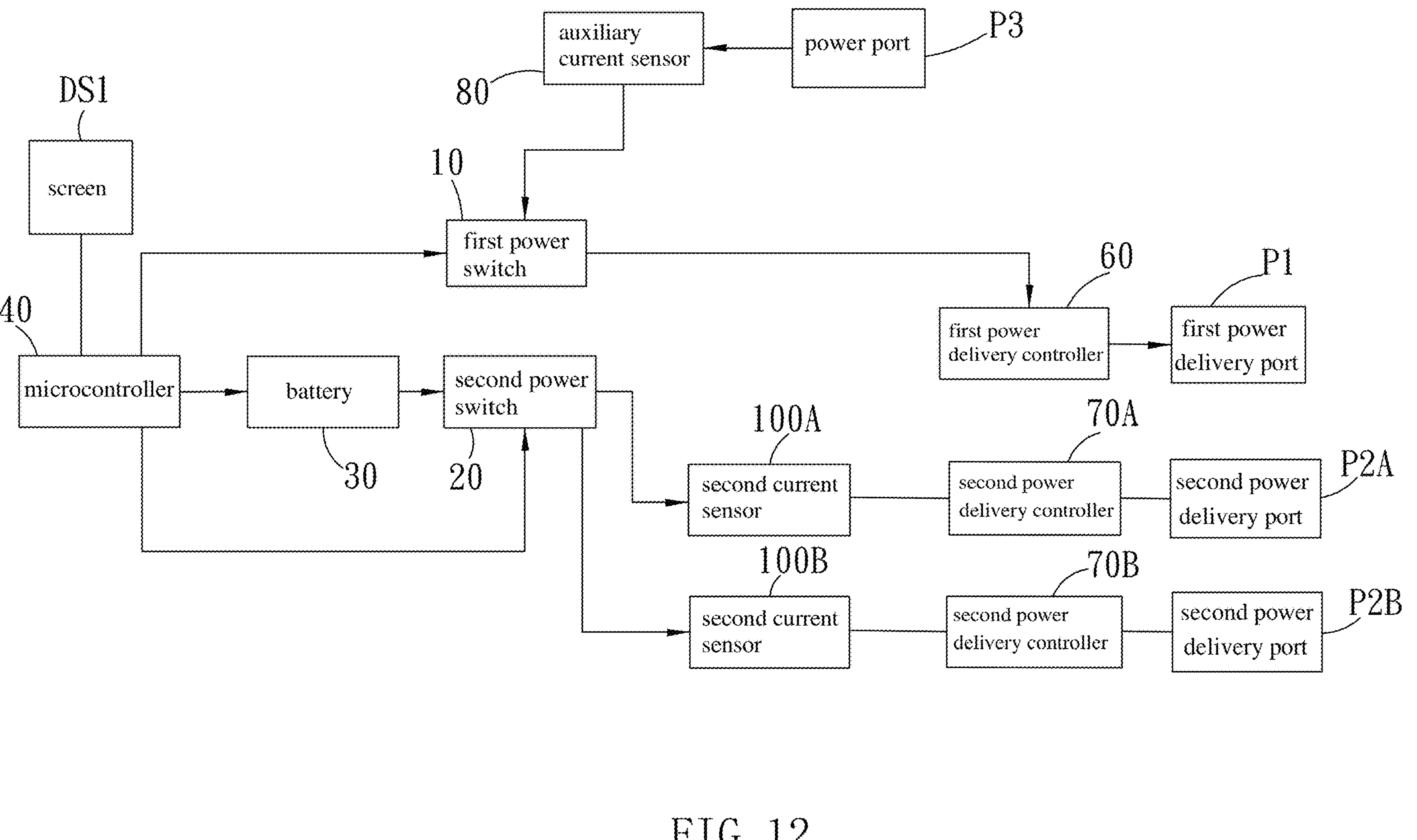
FIG. 12 depicts the operation schematic diagram of the power supply device when the input power is not greater than the total output power requirement but is equal to the first load power requirement of the first powered device according to another embodiment of the present disclosure.

Step S28: controlling the first power switch 10 and the second power switch 20 to switch on and activating the battery 30 to provide the auxiliary electrical energy, wherein the input electrical energy is transmitted to the first power delivery port P1, and the auxiliary electrical energy is transmitted to the second power delivery ports P2A and P2B. Specifically, as shown in FIG. 12, when determining that the input power is equal to the first load power requirement of the first powered device D1, the microcontroller 40 activates the battery 30 to provide the auxiliary electrical energy, and the battery 30 is situated on the discharging state. The microcontroller 40 transmits the first control signal and the second control signal to the first power switch 10 and the second power switch 20, the first power switch 10 is switched on according to the first control signal, and the second power switch 20 is switched on according to the second control signal. Because the first power switch 10 is switched on, the input electrical energy passes the auxiliary current sensor 80 and is transmitted to the first power delivery controller 60. The auxiliary current sensor 80 senses the input current corresponding to the input electrical energy and transmits the value of the input current to the microcontroller 40; the first power delivery controller 60 adjusts the input electrical energy according to the first load power requirement of the first powered device D1 and transmits the adjusted input electrical energy to the first power delivery port P1 to supply electric power to the first powered device D1.

The auxiliary electrical energy passes the second power switch 20 and is divided into a first auxiliary part and a second auxiliary part herein. The first auxiliary part of the auxiliary electrical energy passes the second current sensor 100A and is transmitted to the second power delivery controller 70A, and the second current sensor 100A senses the second output current outputted to the second powered device D2 and transmits the value of the second output current outputted to the second powered device D2 to the microcontroller 40; the second power delivery controller 70A adjusts the first auxiliary part of the auxiliary electrical energy according to the second load power requirement of the second powered device D2 and transmits the adjusted first auxiliary part of the auxiliary electrical energy to the second power delivery port P2A to supply electric power to the second powered device D2. The second auxiliary part of the auxiliary electrical energy passes the second current sensor 100B and is transmitted to the second power delivery controller 70B, and the second current sensor 100B senses the second output current outputted to the second powered device D3 and transmits the value of the second output current outputted to the second powered device D3 to the microcontroller 40; the second power delivery controller 70B adjusts the second auxiliary part of the auxiliary electrical energy according to the second load power requirement of the second powered device D3 and transmits the adjusted second auxiliary part of the auxiliary electrical energy to the second power delivery port P2B to supply electric power to the second powered device D3.

In the method of power management of the present embodiment, according to the input power and the first load power requirement of the first powered device, the input electrical energy is selected whether to be transmitted to the first power delivery port to supply electric power to the first powered device, thereby reducing the loading of the electric power supply of the battery. In addition, by arranging the current sensors, the variations of the load power requirements of the powered devices are monitored.

Figure 13A:
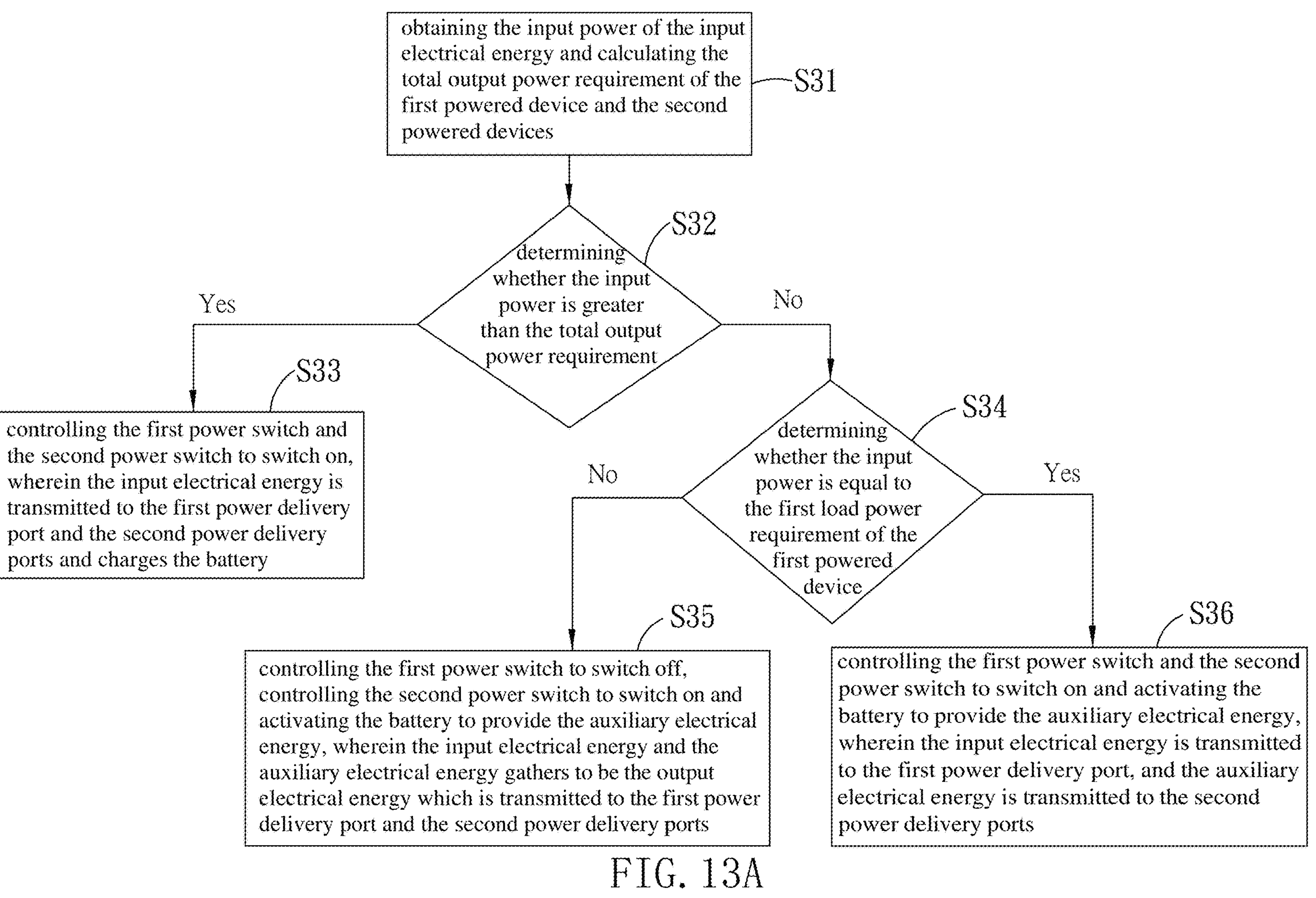
FIG. 13A to FIG. 13C depict the flowchart of a method of power management according to yet another embodiment of the present disclosure.
Figure 13B:
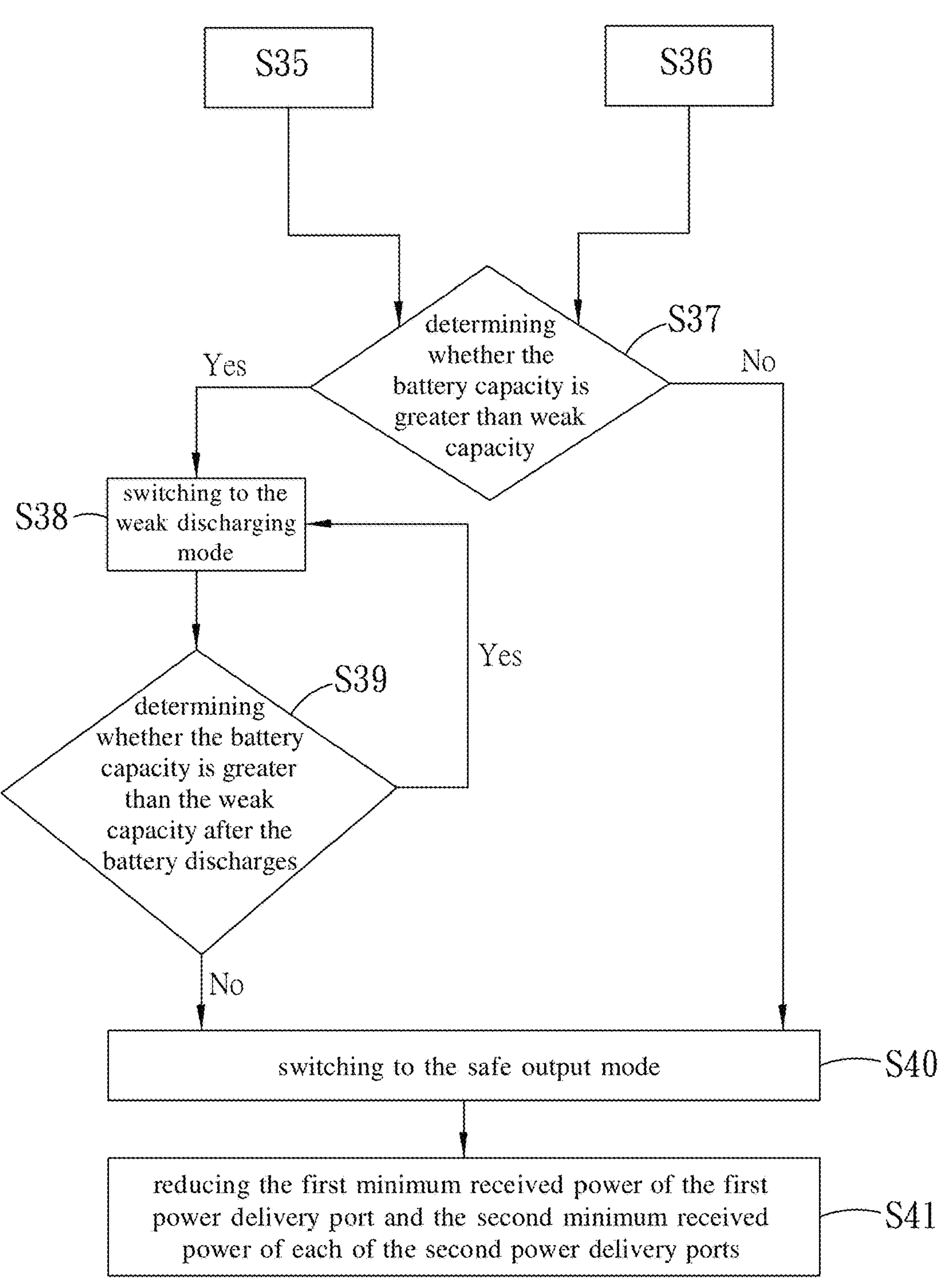
Figure 13C:
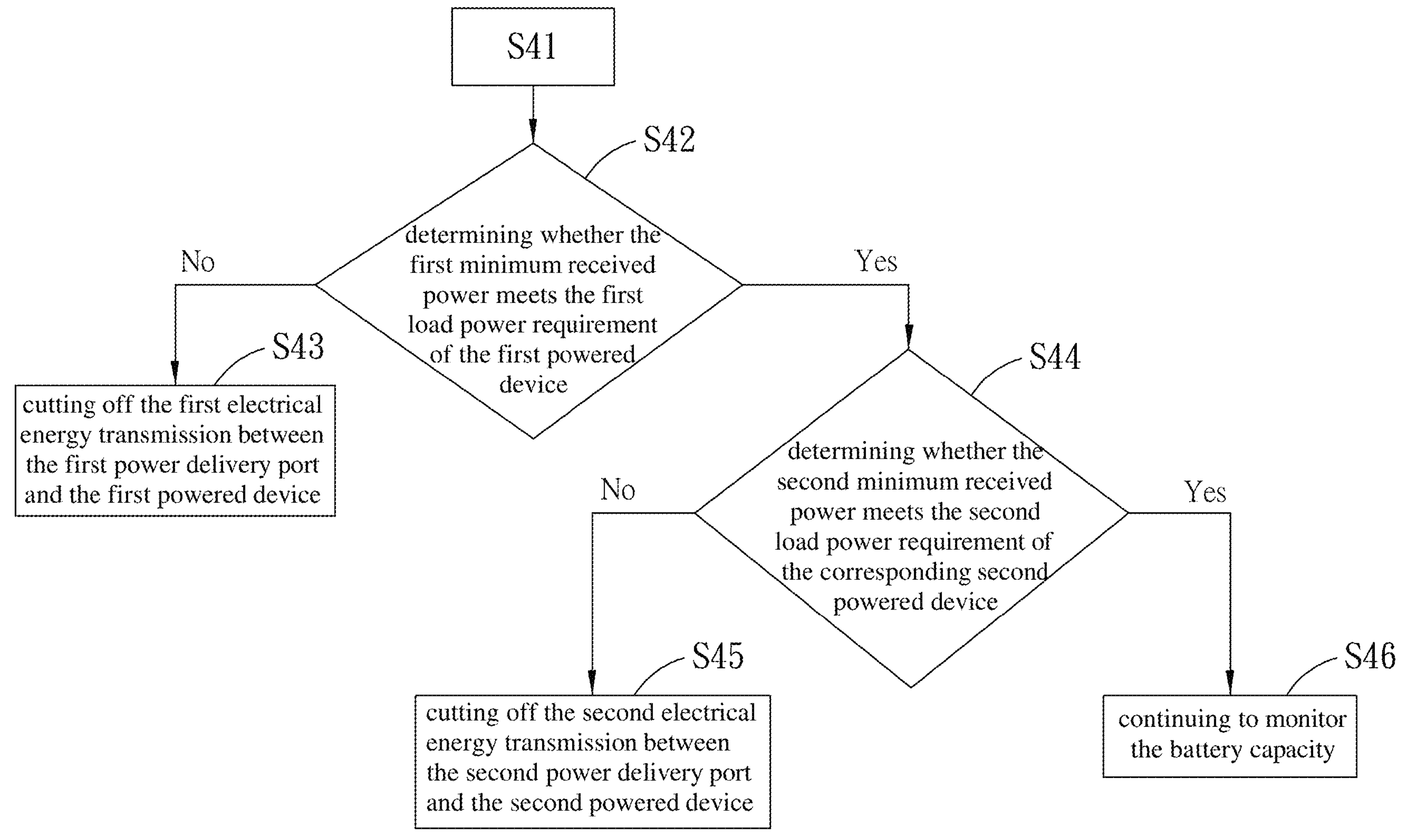

Please refer to FIG. 13A to FIG. 13C, which depict the flowchart of a method of power management according to yet another embodiment of the present disclosure. As shown in FIG. 13A to FIG. 13C, the method of power management includes step S31 to step S46, wherein step S31 to step S36 are the same as step S22, step S24 to step S28 shown in FIG. 8A and FIG. 8B and would not be repeated. Step S31 to step S36 are to select whether to activate the battery 30 to assist the powered devices in supplying electric power, and step S37 to step S46 are to consider whether the battery capacity of the battery 30 is enough to assist the powered devices in supplying electric power. Step S37 to step S46 would be explained by the power supply device 1B shown in FIG. 3 as follows.

It should be noted that the battery capacity of the battery 30 corresponds to the available minimum voltage of the battery 30. For example, the working voltage range of the battery 30 is 3.6V~4.2V, the minimum working voltage of the battery 30 (i.e., 3.6V) corresponds to the available battery capacity of the battery 30, and the battery 30 is able to work normally to supply electric power to the powered devices when the working voltage of the battery 30 is 3.6V~4.2V. When the working voltage of the battery 30 is less than 3.6V, the available battery capacity of the battery 30 is not enough, the battery 30 is unable to work normally to supply electric power to the powered devices. When the battery capacity of the battery 30 is excessively low, continuing to supply electric power to the powered devices by the power supply device 1B should be avoided.

Step S37: determining whether the battery capacity is greater than weak capacity. Specifically, the microcontroller 40 obtains the battery capacity from the battery 30 and compares the battery capacity with the weak capacity to determine whether the battery 30 is able to work normally. When the battery capacity is greater than the weak capacity, the microcontroller 40 determines that the battery 30 is able to work normally and subsequently performs step S38. When the battery capacity is not greater than the weak capacity, the microcontroller 40 determines that the battery 30 is unable to work normally and subsequently performs step S40.

Step S38: switching to the weak discharging mode. Although the available battery capacity of the battery 30 is enough to work normally, the input electrical energy still does not meet the total electricity provision requirement of the first powered device D1 and the second powered devices D2 and D3. Hence, the microcontroller 40 drives the power supply device 1B to switch to the weak discharging mode, and the screen DS1 displays that the power supply device 1B enters the weak discharging mode.

Step S39: determining whether the battery capacity is greater than the weak capacity after the battery 30 discharges. At present, the battery 30 is situated on the discharging state so that the battery capacity of the battery 30 decreases, and step S39 is to ensure whether the battery capacity of the battery 30 continues to output normally. When determining that the battery capacity is greater than the weak capacity, the microcontroller 40 confirms that the battery capacity of the battery 30 can still continue to output normally after the battery 30 discharges and gets back to step S38. When determining that the battery capacity is not greater than the weak capacity (e.g., 20%), the microcontroller 40 confirms that the battery capacity of the battery 30 still can not continue to output normally after the battery 30 discharges and subsequently performs step S40.

Step S40: switching to the safe output mode. Because the battery 30 is unable to work normally, the microcontroller 40 needs to reduce the discharge capacity of the battery 30. The microcontroller 40 drives the power supply device 1B to switch to the safe output mode.

Step S41: reducing the first minimum received power of the first power delivery port P1 and the second minimum received power of each of the second power delivery ports P2A and P2B. In order to reduce the discharge capacity of the battery 30, the microcontroller 40 needs to control the battery 30 to reduce the quantity supplied of electricity offered to the first power delivery port P1, the quantity supplied of electricity offered to the second power delivery port P2A and the quantity supplied of electricity offered to the second power delivery port P2B. Hence, the microcontroller 40 reduces the first minimum received power of the first power delivery port P1, the second minimum received power of the second power delivery port P2A and the second minimum received power of the second power delivery port P2B to achieve the purpose of reducing the discharge capacity of the battery 30.

Step S42: determining whether the first minimum received power meets the first load power requirement of the first powered device D1. Specifically, the microcontroller 40 determines whether the quantity supplied of electricity offered to the first power delivery port P1 after the battery 30 reduces the discharge capacity meets the quantity demanded of electricity of the first powered device D1 according to the reduced first minimum received power and the first load power requirement of the first powered device D1. When determining that the first minimum received power meets the first load power requirement of the first powered device D1, the microcontroller 40 determines that the quantity supplied of electricity offered to the first power delivery port P1 after the battery 30 reduces the discharge capacity meets the quantity demanded of electricity of the first powered device D1 and subsequently performs step S44. When determining that the first minimum received power does not meet the first load power requirement of the first powered device D1, the microcontroller 40 determines that the quantity supplied of electricity offered to the first power delivery port P1 after the battery 30 reduces the discharge capacity does not meet the quantity demanded of electricity of the first powered device D1 and subsequently performs step S43.

Step S43: cutting off the first electrical energy transmission between the first power delivery port P1 and the first powered device D1. Because the reduced first minimum received power does not meet the first load power requirement of the first powered device D1, the microcontroller 40 controls the battery 30 to stop supplying electric power to the first power delivery port P1, thereby cutting off the first electrical energy transmission between the first power delivery port P1 and the first powered device D1. At present, the power supply device 1B does not charge the first powered device D1, and microcontroller 40 controls the screen DS1 to display the alarm message of "insufficient power supply and the battery capacity is not enough to stop the output of the Type-C port."

Step S44: determining whether the second minimum received power meets the second load power requirement of the corresponding second powered device. Specifically, the microcontroller 40 determines whether the quantity supplied of electricity offered to the second power delivery port P2A after the battery 30 reduces the discharge capacity meets the of electricity demand of the second powered device D2 according to the reduced second minimum received power and the second load power requirement of the second powered device D2. When determining that the second minimum received power meets the second load power requirement of the second powered device D2, the microcontroller 40 determines that the quantity supplied of electricity offered to the second power delivery port P2A after the battery 30 reduces the discharge capacity meets the quantity demanded of electricity of the second powered device D2 and subsequently performs step S46. When determining that the second minimum received power does not meet the second load power requirement of the second powered device D2, the microcontroller 40 determines that the quantity supplied of electricity offered to the second power delivery port P2A after the battery 30 reduces the discharge capacity does not meet the quantity demanded of electricity of the second powered device D2 and subsequently performs step S45.

The microcontroller 40 determines whether the quantity supplied of electricity offered to the second power delivery port P2B after the battery 30 reduces the discharge capacity meets the quantity demanded of electricity of the second powered device D3 according to the reduced second minimum received power and the second load power requirement of the second powered device D3. When determining that the second minimum received power meets the second load power requirement of the second powered device D3, the microcontroller 40 determines that the quantity supplied of electricity offered to the second power delivery port P2B after the battery 30 reduces the discharge capacity meets the quantity demanded of electricity of the second powered device D3 and subsequently performs step S46. When determining that the second minimum received power does not meet the second load power requirement of the second powered device D3, the microcontroller 40 determines that the quantity supplied of electricity offered to the second power delivery port P2B after the battery 30 reduces the discharge capacity does not meet the quantity demanded of electricity of the second powered device D3 and subsequently performs step S45.

Step S45: cutting off the second electrical energy transmission between the second power delivery port P2A and the second powered device D2 or the second electrical energy transmission between the second power delivery port P2B and the second powered device D3. Because the reduced second minimum received power does not meet the second load power requirement of the second powered device D2 or the reduced second minimum received power does not meet the second load power requirement of the second powered device D3, the microcontroller 40 controls the battery 30 to stop supplying electric power to the second power delivery port P2A or the second power delivery port P2B, thereby cutting off the second electrical energy transmission between the second power delivery port P2A and the second powered device D2 or the second electrical energy transmission between the second power delivery port P2B and the second powered device D3. At present, the power supply device 1B does not charge the second powered device D2 or the second powered device D3, and microcontroller 40 controls the screen DS1 to display the alarm message of "insufficient power supply and the battery capacity is not enough to stop the output of the Type-A port" or to display the alarm message of "insufficient power supply and the battery capacity is not enough to stop wirelessly charging."

Step S46: continuing to monitor the battery capacity. Specifically, the micro microcontroller 40 still continues to monitor the battery capacity to determine whether the battery capacity of the battery 30 is enough until the battery capacity of the battery 30 is greater than the sum of the weak capacity (e.g., 20%) and preset reserved capacity (e.g., 50%).

For example, the battery capacity of the battery 30 is 10%, and the weak capacity is 20%; the output power of the battery 30 may be greater than 112 W when the battery capacity of the battery 30 exceeds the weak capacity. The input power of the input electrical energy is 15 W, the first load power requirement of the first powered device D1 is 100 W, the second load power requirement of the second powered device D2 is 12 W, the second load power requirement of the second powered device D3 is 15 W, and the total output power requirement is 127 W.

When the battery capacity of the battery 30 is 10%, the output power of the battery 30 is not greater than 112 W. The microcontroller 40 reduce the first minimum received power of the first power delivery port P1, the second minimum received power of the second power delivery port P2A and the second minimum received power of the second power delivery port P2B, and the reduced first minimum received power of the first power delivery port P1 does not meet the first load power requirement of the first powered device D1, but the reduced second minimum received power of the second power delivery port P2A and the reduced second minimum received power of the second power delivery port P2B respectively meet the second load power requirement of the second powered device D2 and the second load power requirement of the second powered device D3. Hence, the microcontroller 40 controls the battery 30 to stop supplying electric power to the first power delivery port P1, the 15 W input electrical energy is transmitted to the battery 30 and gathers with the auxiliary electrical energy to be the 27 W output electrical energy, and the 27 W output electrical energy is transmitted to the second power delivery ports P2A and P2B to supply electric power to the second powered devices D2 and D3.

When the battery capacity of the battery 30 is 0%, the battery 30 is unable to output the electrical energy normally, the second powered device D2 and the second powered device D3 are merely charged by the input electrical energy, and the input power of the input electrical energy is 15 W. The microcontroller 40 reduces the second minimum received power of the second powered device D2 and the second minimum received power of the second powered device D3 again, the reduced second minimum received power of the second powered device D2 and the reduced second minimum received power of the second powered device D3 are respectively 5 W, and the 5 W remaining electrical energy is used to charge the battery 30.

In the method of power management of the present embodiment, it is further considered whether the battery capacity can still continue to output normally. When the battery capacity still can not continue to output normally, the entire output or the partial output of the battery is cut off, thereby prevent the battery from discharging excessively.

Figure 14A:
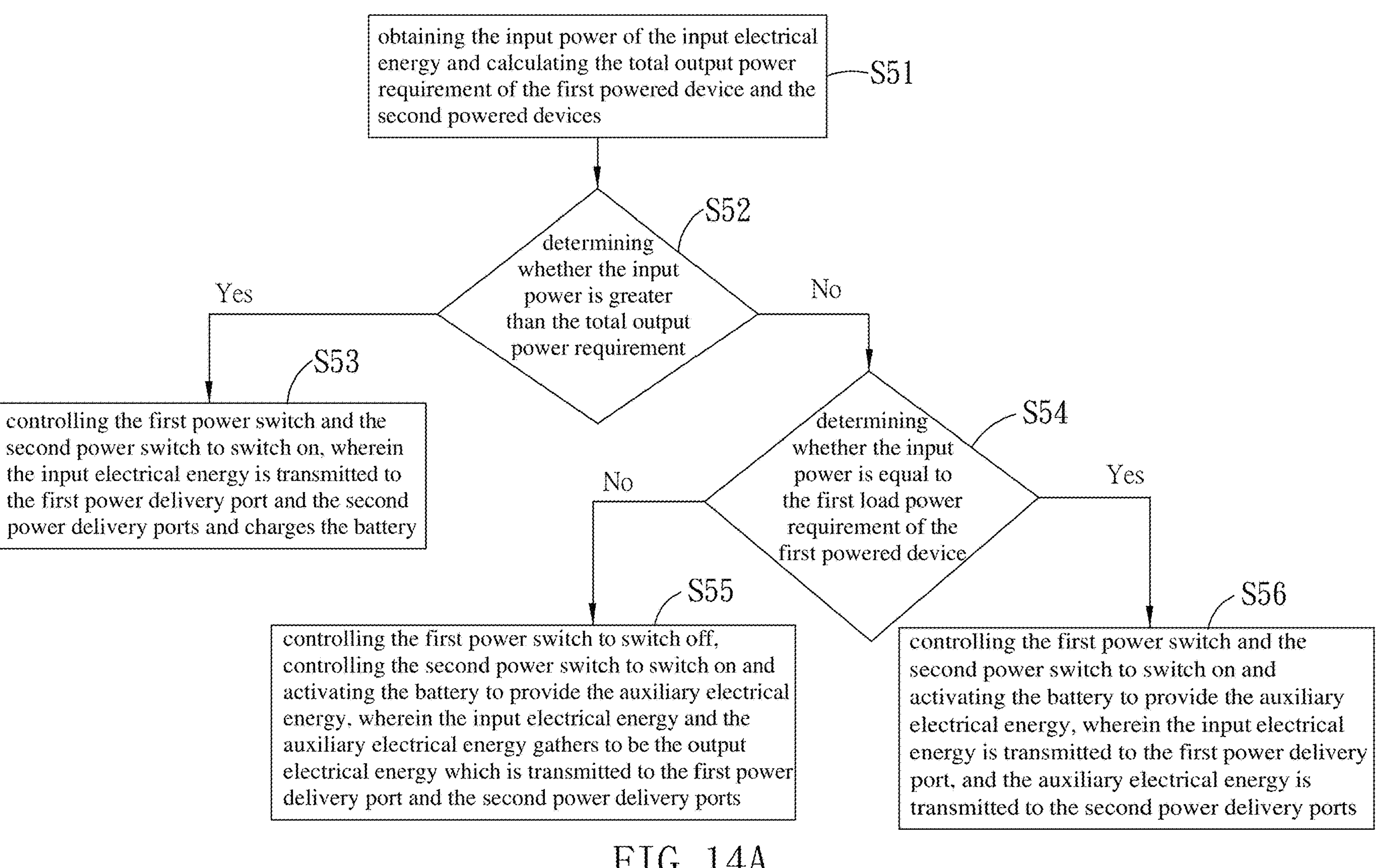
FIG. 14A to FIG. 14C depict the flowchart of a method of power management according to still another embodiment of the present disclosure.
Figure 14B:
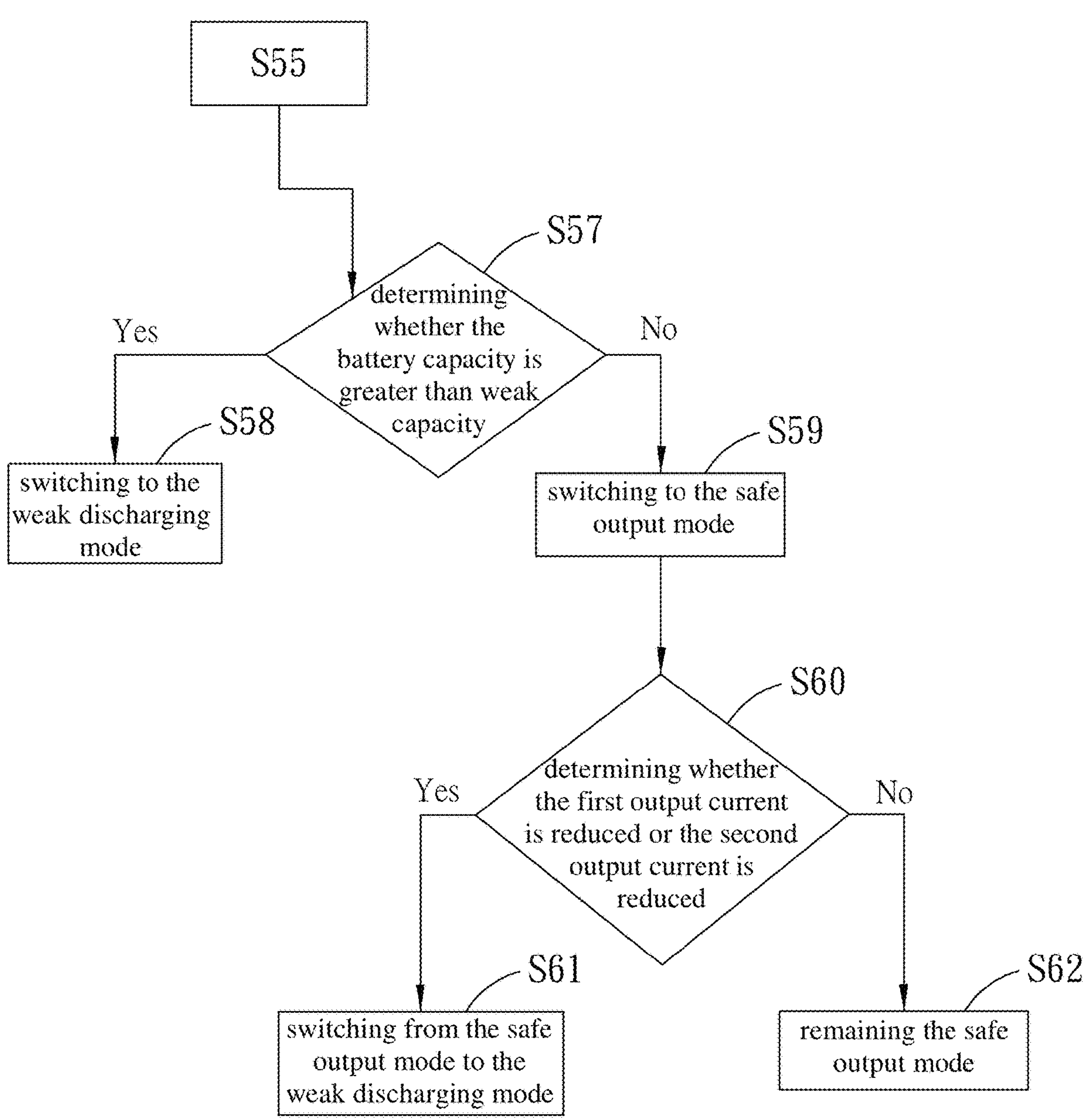
Figure 14C:
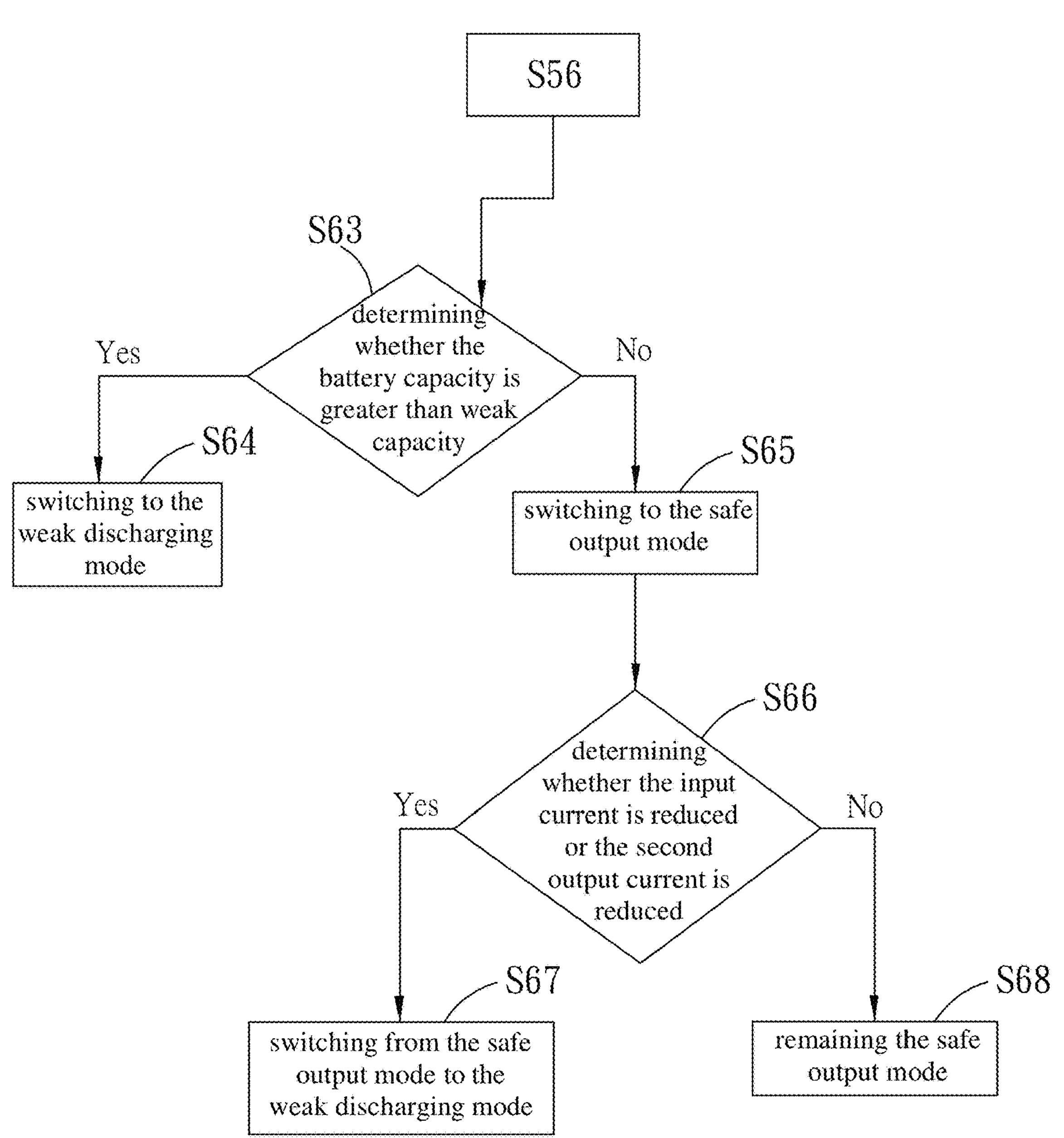

Please refer to FIG. 14A to FIG. 14C, which depict the flowchart of a method of power management according to still another embodiment of the present disclosure. As shown in FIG. 14A to FIG. 14C, the method of power management includes step S51 to step S68, wherein step S51 to step S56 are the same as step S22, step S24 to step S28 shown in FIG. 8A and FIG. 8B and would not be repeated. Step S57 to step S59 and step S63 to step S65 are to consider whether the battery capacity of the battery 30 is enough to assist the powered devices in supplying electric power, and step S60 to step S62 and step S66 to step S68 are to switch the work mode of the power supply device 1B in response to the circumstance that the load power requirement of the powered device is reduced after the powered device is charged. Step S57 to step S68 would be explained by the power supply device 1B shown in FIG. 3 as follows.

Step S57 to step S59 and step S63 to step S65 are the same as step S37, step S38 and step S40 shown in FIG. 13B and would not be repeated.

For the circumstance that the input power is not greater than the total output power requirement and the input power is not equal to the first load power requirement of the first powered device D1, the first load power requirement of the first powered device D1 decreases and the value of the first output current sensed by the first current sensor 90 decreases after the first powered device D1 is charged. Hence, after the first load power requirement of the first powered device D1, the second load power requirement of the second powered device D2 and the second load power requirement of the second powered device D3 are deducted from the input electrical energy, a part of the input electrical energy still remains in the power supply device 1B. The microcontroller 40 controls the power controller 50 to input the part of the input electrical energy into the battery 30 to charge the battery 30, and the battery capacity of the charged battery 30 is first battery capacity.

Alternatively, after the second powered device D2 or D3 is charged, the second load power requirement of the second powered device D2 or the second load power requirement of the second powered device D3 decreases, and the value of the second output current sensed by the second current sensor 100A or the value of the second output current sensed by the second current sensor 100B decreases. Hence, after the first load power requirement of the first powered device D1, the second load power requirement of the second powered device D2 and the second load power requirement of the second powered device D3 are deducted from the input electrical energy, the part of the input electrical energy still remains in the power supply device 1B. The microcontroller 40 controls the power controller 50 to input the part of the input electrical energy into the battery 30 to charge the battery 30, and the battery capacity of the charged battery 30 is the first battery capacity.

Step S60: determining whether the first output current is reduced or the second output current is reduced. Specifically, the microcontroller 40 obtains the value of the first output current outputted to the first powered device D1, the value of the second output current outputted to the second powered device D2 and the value of the second output current outputted to the second powered device D3 from the first current sensor 90 and the second current sensors 100A and 100B. Afterwards, the microcontroller 40 determines whether the first output current is reduced or the second output current is reduced according to the value of the first output current outputted to the first powered device D1, the value of the second output current outputted to the second powered device D2 and the value of the second output current outputted to the second powered device D3.

When determining that the first output current is reduced or the second output current is reduced, the microcontroller 40 subsequently performs step S61. When determining that the first output current is not reduced and the second output current is not reduced, the microcontroller 40 subsequently performs step S62.

Step S61: switching from the safe output mode to the weak discharging mode. Specifically, the microcontroller 40 determines that the first battery capacity is greater than the weak capacity and drives the power supply device 1B to switch from the safe output mode to the weak discharging mode, and the screen DS1 displays that the power supply device 1B enters the weak discharging mode. Afterwards, the microcontroller 40 still continues to monitor the first battery capacity to determine whether the first battery capacity of the battery 30 is enough until the first battery capacity of the battery 30 is greater than the sum of the weak capacity (e.g., 20%) and the preset reserved capacity (e.g., 50%).

Step S62: remaining the safe output mode. Specifically, the microcontroller 40 determines that the first battery capacity is not greater than the weak capacity and drives the power supply device 1B to remain in the safe output mode, and the screen DS1 displays that the power supply device 1B enters the safe output mode.

For the circumstance that the input power is not greater than the total output power requirement and the input power is equal to the first load power requirement of the first powered device D1, the first load power requirement of the first powered device D1 decreases and the value of the input current sensed by the auxiliary current sensor 80 decreases after the first powered device D1 is charged. Hence, after the first load power requirement of the first powered device D1 is deducted from the input electrical energy, a part of the input electrical energy still remains in the power supply device 1B. The microcontroller 40 controls the power controller 50 to input the part of the input electrical energy into the battery 30 to charge the battery 30, and the battery capacity of the charged battery 30 is second battery capacity.

Alternatively, after the second powered device D2 or D3 is charged, the second load power requirement of the second powered device D2 or the second load power requirement of the second powered device D3 decreases, and the value of the second output current sensed by the second current sensor 100A or the value of the second output current sensed by the second current sensor 100B decreases. Hence, after the second load power requirement of the second powered device D2 and the second load power requirement of the second powered device D3 are deducted from the auxiliary electrical energy, a part of the auxiliary electrical energy still remains in the power supply device 1B. The microcontroller 40 controls the battery 30 to reduce the provision of the auxiliary electrical energy, the part of the auxiliary electrical energy charges the battery 30, and the battery capacity of the charged battery 30 is the second battery capacity.

Step S66: determining whether the input current is reduced or the second output current is reduced. Specifically, the microcontroller 40 obtains the value of the input current of the input electrical energy, the value of the second output current outputted to the second powered device D2 and the value of the second output current outputted to the second powered device D3 from the auxiliary current sensor 80 and the second current sensors 100A and 100B. Afterwards, the microcontroller 40 determines whether the input current is reduced or the second output current is reduced according to the value of the input current of the input electrical energy, the value of the second output current outputted to the second powered device D2 and the value of the second output current outputted to the second powered device D3.

When determining that the input current is reduced or the second output current is reduced, the microcontroller 40 subsequently performs step S67. When determining that the input current is not reduced and the second output current is not reduced, the microcontroller 40 subsequently performs step S68.

Step S67: switching from the safe output mode to the weak discharging mode. Specifically, the microcontroller 40 determines that the second battery capacity is greater than the weak capacity and drives the power supply device 1B to switch from the safe output mode to the weak discharging mode, and the screen DS1 displays that the power supply device 1B enters the weak discharging mode. Afterwards, the microcontroller 40 still continues to monitor the second battery capacity to determine whether the second battery capacity of the battery 30 is enough until the second battery capacity of the battery 30 is greater than the sum of the weak capacity (e.g., 20%) and the preset reserved capacity (e.g., 50%).

Step S68: remaining the safe output mode. Specifically, the microcontroller 40 determines that the second battery capacity is not greater than the weak capacity and drives the power supply device 1B to remain in the safe output mode, and the screen DS1 displays that the power supply device 1B enters the safe output mode.

In the method of power management of the present embodiment, according to the variations of the load power requirements of the powered devices, the part of the input electrical energy or the part of the auxiliary electrical is distributed to the battery to charge the battery, thereby increasing the usage time of the power supply device.

In view of the above descriptions, the power supply device and the method of power management of the present disclosure, according to the input power and the total output power requirement, distributes the input electrical energy to supply electric power to the first powered device, the second powered devices and to charge the battery, or selectively activates the battery to provide auxiliary electrical energy and distributes the input electrical energy and the auxiliary electrical energy to supply electric power to the first powered device and the second powered devices. Hence, the power supply device and the method of power management of the present disclosure are able to handle the charging requirement and the discharging requirement of the power supply device synchronously.

What is claimed is:

1. A power supply device comprising:

a power port configured to be connected to an external power source to receive input electrical energy;

a first power delivery port configured to be connected to a first powered device;

a plurality of second power delivery ports configured to be connected to a plurality of second powered devices;

a first power switch connected to the power port and the first power delivery port;

a second power switch connected to the plurality of second power delivery ports and the first power switch;

a battery connected to the second power switch; and a microcontroller connected to the power port, the first power delivery port, the plurality of second power delivery ports, the first power switch, the second power switch and the battery, obtaining input power of the input electrical energy and calculating a total output power requirement of the first powered device and the plurality of second powered devices;

wherein the microcontroller determines whether the input power is greater than the total output power requirement; when determining that the input power is greater than the total output power requirement, the microcontroller controls the first power switch and the second power switch to switch on, and the input electrical energy is transmitted to the first power delivery port and the plurality of second power delivery ports and charges the battery; when determining that the input power is not greater than the total output power requirement, the microcontroller controls the first power switch to switch off, controls the second power switch to switch on and activates the battery to provide auxiliary electrical energy, and the input electrical energy and the auxiliary electrical energy gathers to be output electrical energy which is transmitted to the first power delivery port and the plurality of second power delivery ports.

2. The power supply device according to claim 1, wherein the microcontroller controls the first power switch and the second power switch to switch on when determining that the input power is not greater than the total output power requirement but is equal to a first load power requirement of the first powered device, the input electrical energy is transmitted to the first power delivery port, and the auxiliary electrical energy is transmitted to the plurality of second power delivery ports.

3. The power supply device according to claim 2, wherein the battery is provided with battery capacity; when determining that the input power is not greater than the total output power requirement or the input power is not greater than the total output power requirement but is equal to the first load power requirement of the first powered device, the microcontroller determines whether the battery capacity is greater than weak capacity; when determining that the battery capacity is greater than the weak capacity, the power supply device is switched to a weak discharging mode;

when determining that the battery capacity is not greater than the weak capacity, the power supply device is switched to a safe output mode, and the microcontroller reduces first minimum received power of the first power delivery port and second minimum received power of each of the plurality of second power delivery ports, wherein the first minimum received power and the second minimum received power are all less than the input power.

4. The power supply device according to claim 3, wherein the microcontroller cuts off first electrical energy transmission between the first power delivery port and the first powered device or second electrical energy transmission between the second power delivery port and the second powered device when the first minimum received power does not meet the first load power requirement of the first powered device or the second minimum received power does not meet second load power requirement of the second powered device.

5. The power supply device according to claim 3, further comprising:

a power controller connected to the power port, the microcontroller and the battery and provided with a VIN-DPM function, wherein the microcontroller obtains the input power from the power controller;

a first power delivery controller connected to the first power delivery port, the first power switch and the microcontroller, wherein the microcontroller obtains the first load power requirement of the first powered device from the first power delivery controller; and a plurality of second power delivery controllers respectively connected to the plurality of second power delivery ports, wherein each of the plurality of second power delivery controllers is connected to the second power switch and the microcontroller, the microcontroller obtains a plurality of second load power requirements of the plurality of second powered devices from the plurality of second power delivery controllers, and the total output power requirement is a sum of the first load power requirement and the plurality of second load power requirements.

6. The power supply device according to claim 5, further comprising:

an auxiliary current sensor connected to the power port, the power controller, the first power switch and the microcontroller, sensing an input current corresponding to the input electrical energy, and transmitting a value of the input current to the microcontroller;

a first current sensor connected to the battery, the first power delivery controller and the microcontroller, sensing a first output current outputted to the first powered device, and transmitting a value of the first output current to the microcontroller; and a plurality of second current sensors connected to the plurality of second power delivery controllers, wherein each of the plurality of second current sensors is connected to the second power switch and the microcontroller, senses a second output current outputted to the corresponding second powered device, and transmits a value of the corresponding second output current to the microcontroller.

7. The power supply device according to claim 6, wherein the microcontroller controls the power controller to input a part of the input electrical energy into the battery when determining that the battery capacity is not greater than the weak capacity and the first output current is reduced or the second output current is reduced, and the battery capacity of the charged battery is first battery capacity;

the microcontroller determines whether the first battery capacity is greater than the weak capacity.

8. The power supply device according to claim 7, wherein the power supply device is switched from the safe output mode to the weak discharging mode when the microcontroller determines that the first battery capacity is greater than the weak capacity;

when the microcontroller determines that the first battery capacity is not greater than the weak capacity, the power supply device remains in the safe output mode.

9. The power supply device according to claim 6, wherein the microcontroller controls the power controller to input a part of the input electrical energy into the battery or control the battery to reduce the provision of the auxiliary electrical energy when determining that the battery capacity is not greater than the weak capacity and the input current is reduced or the second output current is reduced, and the battery capacity of the charged battery is second battery capacity;

the microcontroller determines whether the second battery capacity is greater than the weak capacity.

10. The power supply device according to claim 7, wherein the power supply device is switched from the safe output mode to the weak discharging mode when the microcontroller determines that the second battery capacity is greater than the weak capacity;

when the microcontroller determines that the second battery capacity is not greater than the weak capacity, the power supply device remains in the safe output mode.

11. The power supply device according to claim 1, wherein the microcontroller determines whether the power port is connected to the external power source; when determining that the power port is connected to the external power source, the microcontroller ensures and obtains the input power of the input electrical energy; when determining that the power port is not connected to the external power source, the microcontroller controls the battery to transmit supply electrical energy to the first power delivery port and the plurality of second power delivery ports.

12. The power supply device according to claim 1, wherein the first power switch and the second power switch are BtoB MOSFETs.

13. A method of power management, for a power supply device which comprises a power port configured to be connected to an external power source to receive input electrical energy, a first power delivery port configured to be connected to a first powered device, a plurality of second power delivery ports configured to be connected to a plurality of second powered devices, a first power switch, a second power switch, a battery and a microcontroller, performed by the microcontroller and comprising:

obtaining input power of the input electrical energy and calculating a total output power requirement of the first powered device and the plurality of second powered devices;

determining whether the input power is greater than the total output power requirement;

when determining that the input power is greater than the total output power requirement, controlling the first power switch and the second power switch to switch on, wherein the input electrical energy is transmitted to the first power delivery port and the plurality of second power delivery ports and charges the battery;

when determining that the input power is not greater than the total output power requirement, controlling the first power switch to switch off, controlling the second power switch to switch on and activating the battery to provide auxiliary electrical energy, wherein the input electrical energy and the auxiliary electrical energy gathers to be output electrical energy which is transmitted to the first power delivery port and the plurality of second power delivery ports.

14. The method of power management according to claim 13, further comprising:

when determining that the input power is not greater than the total output power requirement but is equal to a first load power requirement of the first powered device, controlling the first power switch and the second power switch to switch on, wherein the input electrical energy is transmitted to the first power delivery port, and the auxiliary electrical energy is transmitted to the plurality of second power delivery ports.

15. The method of power management according to claim 14, wherein the battery is provided with battery capacity; when determining that the input power is not greater than the total output power requirement or the input power is not greater than the total output power requirement but is equal to the first load power requirement of the first powered device, determining whether the battery capacity is greater than weak capacity;

when determining that the battery capacity is greater than the weak capacity, driving the power supply device to switch to a weak discharging mode;

when determining that the battery capacity is not greater than the weak capacity, driving the power supply device to switch to a safe output mode and reducing first minimum received power of the first power delivery port and second minimum received power of each of the plurality of second power delivery ports, wherein the first minimum received power and the second minimum received power are all less than the input power.

16. The method of power management according to claim 15, further comprising:

when the first minimum received power does not meet the first load power requirement of the first powered device or the second minimum received power does not meet second load power requirement of the second powered device, cutting off first electrical energy transmission between the first power delivery port and the first powered device or second electrical energy transmission between the second power delivery port and the second powered device.

17. The method of power management according to claim 15, wherein the power supply device further comprises an auxiliary current sensor, a first current sensor and a plurality of second current sensors, and the method of power management further comprises:

sensing an input current corresponding to the input electrical energy and transmitting a value of the input current to the microcontroller by the auxiliary current sensor;

sensing a first output current outputted to the first powered device and transmitting a value of the first output current to the microcontroller by the first current sensor;

sensing a second output current outputted to the corresponding second powered device and transmitting a value of the corresponding second output current to the microcontroller by each of the plurality of second current sensors.

18. The method of power management according to claim 17, further comprising:

when determining that the battery capacity is not greater than the weak capacity and the first output current is reduced or the second output current is reduced, controlling a part of the input electrical energy to input into the battery, wherein the battery capacity of the charged battery is first battery capacity;

determining whether the first battery capacity is greater than the weak capacity;

when determining that the first battery capacity is greater than the weak capacity, driving the power supply device to switch from the safe output mode to the weak discharging mode;

when determining that the first battery capacity is not greater than the weak capacity, remaining the safe output mode of the power supply device.

19. The method of power management according to claim 17, further comprising:

when determining that the battery capacity is not greater than the weak capacity and the input current is reduced or the second output current is reduced, controlling a part of the input electrical energy to input into the battery or controlling the battery to reduce the provision of the auxiliary electrical energy, wherein the battery capacity of the charged battery is second battery capacity;

determining whether the second battery capacity is greater than the weak capacity;

when determining that the second battery capacity is greater than the weak capacity, driving the power supply device to switch from the safe output mode to the weak discharging mode;

when determining that the second battery capacity is not greater than the weak capacity, remaining the safe output mode of the power supply device.

20. The method of power management according to claim 13, further comprising:

determining whether the power port is connected to the external power source;

when determining that the power port is connected to the external power source, ensuring and obtaining the input power of the input electrical energy;

when determining that the power port is not connected to the external power source, controlling the battery to transmit supply electrical energy to the first power delivery port and the plurality of second power delivery ports.

* * * * *